(12) United States Patent
Berkeman et al.

(10) Patent No.: US 7,602,852 B2
(45) Date of Patent: Oct. 13, 2009

(54) INITIAL PARAMETER ESTIMATION IN OFDM SYSTEMS

(75) Inventors: Anders Berkeman, Lund (SE); Jim Svensson, Ronneby (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 726 days.

(21) Appl. No.: 11/110,840

(22) Filed: Apr. 21, 2005

(65) Prior Publication Data

US 2006/0239179 A1     Oct. 26, 2006

(51) Int. Cl.
    H04L 27/28     (2006.01)
(52) U.S. Cl. .................. 375/260; 375/267; 375/343; 375/354; 375/355; 375/371; 370/206; 370/503; 455/403; 455/516
(58) Field of Classification Search .......... 375/232, 375/260, 267, 316, 342, 343, 348, 350, 354, 375/355, 146, 367, 371; 370/203, 206, 286, 370/208, 503, 338; 455/403, 452, 516
See application file for complete search history.

(56) References Cited

U.S. PATENT DOCUMENTS

| 6,074,086 | A | 6/2000 | Yonge, III |
| 6,208,695 | B1 | 3/2001 | Klank et al. |
| 6,459,744 | B1 | 10/2002 | Helard et al. |
| 6,646,980 | B1 | 11/2003 | Yamamoto et al. |
| 6,647,025 | B1 | 11/2003 | Sudo |
| 6,658,063 | B1 | 12/2003 | Mizoguchi et al. |
| 6,865,174 | B1 * | 3/2005 | Tsubouchi et al. ........... 370/342 |
| 7,280,621 | B1 * | 10/2007 | Murphy ...................... 375/340 |
| 2003/0026295 | A1 | 2/2003 | Baum et al. |
| 2003/0026360 | A1 | 2/2003 | Ramasubramanian et al. |

(Continued)

FOREIGN PATENT DOCUMENTS

EP     0371357 A2     6/1990

(Continued)

OTHER PUBLICATIONS

Palin, A. & Rinne, J., "Enhanced symbol synchronization method of OFDM system in SFN channels," Globecom '98, Sydney, pp. 3238-3243, 1998.

(Continued)

*Primary Examiner*—Shuwang Liu
*Assistant Examiner*—Hirdepal Singh
(74) *Attorney, Agent, or Firm*—Potomac Patent Group PLLC

(57) ABSTRACT

A coarse estimate of a location of an information carrying part of a symbol in a received signal in a telecommunication system is generated. This involves generating correlation values by correlating the received signal with a delayed received signal. A maximum correlation value of the correlation values is identified, and a duration in time during which the correlation values are greater than or equal to a predetermined percentage of the maximum correlation value is identified, wherein the duration in time begins at a first moment in time and ends at a second moment in time. The coarse estimate of the location of the peak correlation value is set equal to a moment in time between the first moment in time and the second moment in time, for example, a midpoint between the first moment in time and the second moment in time.

35 Claims, 13 Drawing Sheets

U.S. PATENT DOCUMENTS

| | | | |
|---|---|---|---|
| 2003/0028360 A1 | 2/2003 | Bochobza-Degani et al. | |
| 2003/0072256 A1 | 4/2003 | Kim | |
| 2003/0117943 A1 | 6/2003 | Sakata et al. | |
| 2003/0215022 A1* | 11/2003 | Li et al. | 375/260 |
| 2003/0219084 A1 | 11/2003 | Parker | |
| 2004/0005018 A1 | 1/2004 | Zhu et al. | |
| 2004/0005022 A1 | 1/2004 | Zhu et al. | |
| 2004/0008802 A1 | 1/2004 | Galperin et al. | |
| 2004/0190560 A1* | 9/2004 | Maltsev et al. | 370/503 |
| 2005/0008088 A1 | 1/2005 | Liu et al. | |
| 2007/0104250 A1* | 5/2007 | Rice | 375/146 |
| 2008/0095039 A1* | 4/2008 | Joo et al. | 370/210 |

FOREIGN PATENT DOCUMENTS

| | | |
|---|---|---|
| EP | 0853410 A2 | 7/1998 |
| EP | 1079579 A1 | 2/2001 |
| EP | 1331783 A2 | 7/2003 |
| EP | 1387544 A2 | 2/2004 |
| EP | 1396953 A1 | 3/2004 |
| EP | 1469647 A1 | 10/2004 |
| GB | 2373692 A | 9/2002 |
| WO | WO 2004/028055 A1 | 4/2004 |
| WO | WO 2004/036861 A2 | 4/2004 |

OTHER PUBLICATIONS

ETSI EN 300 744 V.1.4.1 (Jan. 2001), Digital Video Broadcasting (DVB); Framing structure, channel coding and modulation for digital terrestrial television.

Speth et al., "Optimum Receiver Design for OFDM-Based Broadband Transmission—Part II: A Case Study", IEEE Transactions on Communications, vol. 49, No. 4, Apr. 2001.

Brugger, R. & Hemingway, D., "*OFDM receivers—impact on coverage of inter-symbol interference and FFT window positioning*", European Broadcasting Union Technical Review, Jul. 2003.

Ramasubramanian, K. & Baum, K., "An OFDM Timing Recovery Scheme with Inherent Delay-Spread Estimation", IEEE Globecom '01, vol. 5, pp. 3111-3115.

PCT International Search Report, dated Sep. 25, 2006, in connection with International Application No. PCT/EP2006/003173.

PCT Written Opinion, dated Sep. 25, 2006, in connection with International Application No. PCT/EP2006/003173.

European Patent Office Communication pursuant to Article 94(3) EPC, dated Feb. 12, 2008, in connection with EP Application No. 06 742 547.0-2415.

* cited by examiner

INITIAL PARAMETER ESTIMATION IN OFDM SYSTEMS

BACKGROUND

The invention relates to digital communication employing Orthogonal Frequency Division Multiplexing (OFDM), and more particularly to using properties of the guard interval to determine initial timing synchronization.

Orthogonal Frequency Division Multiplexing (OFDM) is a method that has been increasingly popular for transmitting digital information. Currently it is, for example, used for Digital Audio Broadcasting (DAB), Digital Video Broadcasting (DVB), and for some Wireless Local Area Network (WLAN) standards like IEEE 802.11a and IEEE 802.1g. One of the reasons for using OFDM is that it allows for communication over highly time-dispersive channels using reasonable complexity at the receiver side.

The way to handle large delay spreads for a system based on OFDM is to make use of a guard interval (GI). The GI (also referred to in the literature as a "cyclic prefix", or "CP") is simply a copy of the last part of an OFDM symbol that is sent before the actual symbol. This is schematically illustrated in FIG. 1, which shows a number of symbols. An exemplary one of the symbols 101 includes a last portion 103 that is transmitted as a preceding guard interval 105 (time flows from left to right in the figure). Other guard intervals are similarly formed from end portions of their immediately succeeding symbols.

It is well-known that for a system based on OFDM the effect of the time-dispersive channel, known as inter-symbol interference (ISI), can be avoided provided that the length of the GI, $T_G$, is at least as long as the (maximum) duration of the impulse response of the channel, henceforth denoted $T_m$. Because of the ability of an OFDM system to handle large delay spreads, it is very suitable for so-called Single Frequency Networks (SFN), which might be used for broadcasting. (In a single frequency network, geographically spaced transmitters operate on a same frequency. To reduce interference, they are time synchronized with one another.)

Now, as discussed above, ISI free reception is possible whenever $T_m \leq T_G$. However, this requires identifying the start of the information carrying part of the signal. For this reason, OFDM receivers include arrangements for estimating the timing and frequency of the received signal. FIG. 2 is a block diagram of an exemplary OFDM receiver. An analog signal, r(t), generated by receiving and downconverting a radiofrequency signal, is supplied to an analog-to-digital (A/D) converter 201. The digitized signal, r(k), is then supplied to a coarse timing and frequency estimation unit 203, which generates a coarse estimate of the timing and frequency offset of the received signal. (The frequency offset is the difference between the frequency of the transmitted signal and the frequency of the received signal.) This information is supplied to a frequency correction unit 205 as well as a GI removal unit 207. The GI removal unit 207 also receives the output of the frequency correction unit 205. Based on the best timing and frequency information available, the GI removal unit 207 removes the GI and supplies the information part of the received signal to an FFT unit 209, whose output is supplied to the remainder of the receiver, including a refined timing and frequency estimation unit 211, which is able to generate more accurate timing and frequency information from the FFT output signal. The more accurate frequency information is fed back to the frequency correction unit 205 to improve the receiver's performance. The more accurate timing information is similarly fed back to the GI removal unit 207 to improve the receiver's performance.

Focusing now on the coarse timing and estimation unit 203, the usual way to find the start of the symbol is by correlating the received signal with a delayed and complex conjugated version of itself and then identifying where the absolute value of the output of the correlator reaches its maximum. FIG. 3 is a block diagram of a conventional correlator that can be used for this purpose. A received signal, r(n) is supplied directly to one input of a multiplier 301, and also to an input of a delay unit 303. The delay unit 303 delays the signal by an amount, $T_u$ (where $T_u$ is the duration of the information carrying part of one symbol). In the discussion which follows, N is a number of samples associated with the duration $T_u$. Typically, N may be the number of samples corresponding to the duration $T_u$, where N is equivalent to the size of the FFT. It should be noted, however that the invention is not limited to that particular case. The complex conjugate of the output of the delay unit 303 is formed (denoted by the "*" in FIG. 3), and supplied to another input of the multiplier 301. The product (denoted y(n)) generated at the output of the multiplier 301 is supplied to a summing unit 305, which generates a moving sum total of the products. The moving sum represents the amount of correlation, denoted "corr(n)", which mathematically can be represented by $$corr(n) = \sum_{k=0}^{\text{NUM\_TERMS}-1} y(n-k)$$
$$= \sum_{k=0}^{\text{NUM\_TERMS}-1} r(n-k) \cdot r^*(n-k-N),$$

where r*(n–k–N) is the complex conjugate of r(n–k–N), and NUM_TERMS is the number of terms in the moving sum.

The phase of the complex valued correlation term, corr(n), can be used to determine the frequency offset. To determine the point at which maximum correlation is reached, the output of the summing unit 305 is supplied to an absolute value unit 307, whose output indicates the magnitude of the correlation value, |corr(n)|.

The result of the complex conjugation and multiplication, y(n), will appear as random noise except when r(n–N) contains the GI and r(n) contains the data copied into the GI. FIG. 4 is a timing diagram that illustrates the relationship between the received signal, r(n), a delayed signal r(n–N), and the moving sum, |corr(n)| for an ideal situation in which the channel has no associated delay spreading.

As can be seen in FIG. 4, if the information carrying part of the signal starts at t=0, the correlation peak occurs at t=–$T_G$. Consequently, for the case in which the peak occurs exactly where expected and $T_m$=0, one could decide to place the start of the Fast Fourier Transform (FFT) window at the point where the peak is found, or one might alternatively decide to take the start of the window as much as $T_G$ later. In practice, depending on how the error in the peak location manifests itself, one should add a certain bias, $T_B$, to the position where the correlation peak is found in order to avoid positioning the FFT window too early. A natural choice for $T_B$ is $T_G/2$, since this gives the largest margin for error (i.e., to avoid starting the FFT window outside of the GI).

In case the channel is time-dispersive, the output of the correlator will not show a distinct peak, but rather show up as a plateau. This is illustrated in FIG. 5, which is a timing diagram that illustrates the relationship between the received signal, r(n), a delayed signal r(n−N), and the moving sum, |corr(n)| for a situation in which the channel has a moderate amount of delay spreading.

Again, suppose the information part of the OFDM starts at t=0. If the channel has a maximum delay spread, $T_m$, the requirement on the start of the FFT window is given by $$-T_G+T_m \leq t \leq 0. \quad (1)$$

Thus, as long as $T_m \leq T_G$ it is possible to avoid ISI if t is chosen according to equation (1). However, if $T_m > T_G$ the issue is to choose t such that the effect of ISI is minimized. For systems designed for use in a SFN, the guard interval is typically so large that the first situation is the likelier one.

The time dispersive channel has the effect of delaying the location of the correlator peak compared to the non-dispersive situation. Moreover, the variance of the peak position will increase significantly. The situation becomes even worse in SFNs, where the impulse response of the channel might consist of rays coming from two transmitters which are synchronized, but at very different distances from the receiver. Suppose that the delay spread for the channels between one transmitter and the receiver is small in comparison to the total delay spread experienced by the receiver. The channel might then be modeled as a two ray channel, where the distance between the rays causes a delay spread equal to $T_m$. It was observed in A. Palin and J. Rinne, "Enhanced symbol synchronization method for OFDM system in SFN channels," Globecom'98, Sydney, pp. 3238-3243, 1998 (henceforth "Palin and Rinne"), that for such a channel synchronization based on the peak position of the correlator output will not work well. Specifically, if the timing is based on the peak of the correlator, the maximum delay spread that can be handled by the system will be reduced to $T_m=T_G/2$.

The problem was addressed in Palin and Rinne by using two correlators, the second of which has a delay that equals the length of an entire OFDM symbol including the GI. The output from the first correlator is fed to another correlator, and the output from this latter correlator shows a more distinct peak than the output from the first one. If one assumes that the peak will be found in the middle of the above mentioned plateau, that is, at $-T_G+T_m/2$, then it is possible to choose $T_B=T_G-T_m/2$. Clearly, assuming that $T_m$ is $T_G$ will always give a sampling time that is ISI free. In terms of complexity, however, this approach is much worse since it requires one more correlator, with a delay that equals the length of an entire OFDM symbol including the GI. In addition, in case $T_m$ is significantly smaller than $T_G$, the sampling point will be found close to $t=-T_G/2$ rather than at t=0. Although this will guarantee ISI free reception, it will put unnecessary hard requirements on the channel estimation in the receiver.

Consequently, there is a need to achieve coarse synchronization using an algorithm that is feasible for both small and large values of $T_m$, and which is not computationally complex.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in apparatuses and methods of generating a coarse estimate of a location of an information carrying part of a symbol in a received signal in a telecommunication system. This involves generating correlation values by correlating the received signal with a delayed received signal. A maximum correlation value of the correlation values is identified, and a duration in time during which the correlation values are greater than or equal to a predetermined percentage of the maximum correlation value is identified, wherein the duration in time begins at a first moment in time and ends at a second moment in time. For example, the predetermined percentage, X, may satisfy $50\% \leq X < 100\%$. The coarse estimate of the location of the peak correlation value is set equal to a moment in time between the first moment in time and the second moment in time.

For example, in some embodiments, the moment in time between the first moment in time and the second moment in time is a midpoint between the first moment in time and the second moment in time.

In another aspect, the coarse estimate of the location of the peak correlation value can be used to determine a starting point of a Fast Fourier Transform (FFT) window. The received signal is then processed with an FFT having the FFT window that begins at the determined starting point.

The various aspects disclosed herein are very useful in systems in which the received signal comprises a guard interval followed by a symbol; the symbol comprises a first portion and a last portion; and the guard interval comprises the last portion of the symbol. In such systems, and in accordance with another aspect, a bias term, $T_B$, can be determined in accordance with $T_B = x \cdot T_G$, wherein $T_G$ is the duration of the guard interval, and $0 \leq x \leq 0.5$. The starting point of the FFT window, $t_{FFT}$, is then determined in accordance with $$t_{FFT}=T_{peak}+T_B,$$

where $T_{peak}$ is the coarse estimate of the location of the peak correlation value.

In alternative embodiments, an estimated delay spread, $T_m$, associated with the received signal is determined in accordance with $$T_m=2PW_{100-\Delta X}-PW_{100-2\Delta X},$$

where $PW_{100-\Delta X}$ is a first peak width representing a length of the duration of time between the first moment in time when the correlation values are greater than or equal to the predetermined percentage, X, of the maximum correlation value and the second moment in time when the correlation values are greater than or equal to the predetermined percentage, X, of the maximum correlation maximum value; and $PW_{100-2\Delta X}$ is a second peak width representing a length of a duration of time between a first moment in time when the correlation values are greater than or equal to $100-2\Delta X$ % of the maximum correlation value, and a second moment in time when the correlation values are greater than or equal to $100-2\Delta X$ % of the maximum correlation value, wherein $\Delta X=100-X$.

In still another aspect, a bias term, $T_B$, may be determined in accordance with $T_B=T_G-x \cdot T_m$, wherein $0.5 \leq x \leq 1$; and the starting point of the FFT window, $T_{FFT}$, is determined in accordance with $$t_{FFT}=T_{peak}+T_B;$$

where $T_{peak}$ is the coarse estimate of the location of the peak correlation value.

In yet another aspect, a coarse timing estimate of a received signal in a telecommunication system is determined, wherein the received signal comprises a guard interval followed by a symbol; the symbol comprises a first portion and a last portion; and the guard interval comprises the last portion of the symbol. This involves generating correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-k)|$$

$$= \sum_{k=0}^{NUM\_TERMS-1} |r(n-k) - r(n-k-N)|$$

where NUM_TERMS is the number of terms in the moving sum, and N is a number of samples associated with the duration of an information carrying part of the symbol. A minimum plateau of the correlation values is identified, wherein the minimum plateau is a duration in time during which the correlation values are associated with a minimum correlation value. A moment in time associated with the correlator values starting to increase from the correlation values associated with the minimum correlation value is determined; and the determined moment in time is used to determine a coarse estimate of the beginning of a next received symbol.

In some embodiments, determining the moment in time associated with the correlator values starting to increase from the correlation values associated with the minimum correlation value comprises: determining a minimum correlation value of the correlation values; and determining a moment in time when the correlation values begin to exceed the minimum correlation value by a determined amount. In some embodiments, the determined amount is a predetermined value. In alternative embodiments, the determined amount is determined by determining a maximum correlation value of the correlation values, and determining a difference between the maximum correlation value and the minimum correlation value. The difference is multiplied by a predetermined fraction.

In yet another aspect, determining the moment in time associated with the correlator values starting to increase from the correlation values associated with the minimum correlation value comprises determining a minimum correlation value of the correlation values; and determining a maximum correlation value of the correlation values. A plateau of correlation values that are less than or equal to a value, $corr_{plateau}$ is determined. The value, $corr_{plateau}$ is defined as $$corr_{plateau} = corr_{min} + X \cdot (corr_{max} - corr_{min}),$$

where $corr_{min}$ is the minimum correlation value, $corr_{max}$ is the maximum correlation value, and X is a number such that $0 < X < 1$. For example, in some embodiments X=0.1. A first moment in time associated with a first-occurring one of the plateau of correlation values is determined; and a second moment in time associated with a last-occurring one of the plateau of correlation values is determined. A third moment in time that occurs between the first moment in time and the second moment in time is then determined. The third moment in time may be, for example, a midpoint between the first moment in time and the second moment in time.

In still another aspect, a signal to noise ratio of a received signal, wherein the received signal comprises a symbol, is determined. This involves determining a number of values, $corr_{mod}(n)$ in accordance with $$corr_{mod}(n) = \sum_{k=0}^{NUM\_TERMS-1} |y(n-k)|$$

$$= \sum_{k=0}^{NUM\_TERMS-1} |r(n-k) - r(n-k-N)|,$$

where r(n) is a sample of the received signal, and N is a number of samples associated with a duration of an information carrying part of the symbol. The number of correlation values may typically correspond to the number of samples in one symbol, but the invention is not limited to that case. A maximum value, $corr_{max}$, is determined such that $corr_{max} = \max(corr_{mod}(n))$; and a minimum value, $corr_{min}$, is determined such that $corr_{min} = \min(corr_{mod}(n))$. The signal to noise ratio, SNR, of the received signal is determined in accordance with $$\widehat{SNR} = \left(\frac{corr_{max}}{corr_{min}}\right)^2 - x_1,$$

where $x_1$ is either 0 or 1.

In yet other aspects, compensation for a frequency error in a received signal in a telecommunication system is achieved, wherein the received signal comprises a guard interval followed by a symbol; the symbol comprises a first portion and a last portion; and the guard interval comprises the last portion of the symbol. Such embodiments comprise generating first quantized samples of the received signal, generating second quantized samples of the received signal based on the first quantized samples, wherein each second quantized sample comprises a 1-bit real part and a 1-bit imaginary part. Correlation values are generated by correlating the second quantized samples of the received signal with the second quantized samples of a delayed received signal. An estimate of a peak correlation value is determined from the generated correlation values. An initial phase offset is determined from the estimate of the peak correlation value. A phase offset compensation is determined based on the phase offset and based on bias introduced by quantization. The first quantized samples of the received signal are then adjusted based on the phase offset compensation.

In an alternative, compensation for the frequency error in the received signal includes generating first quantized samples of the received signal, generating second quantized samples of the received signal based on the first quantized samples, wherein each second quantized sample comprises a 1-bit real part and a 1-bit imaginary part. Correlation values are generated by correlating the second quantized samples of the received signal with the second quantized samples of a delayed received signal. An estimate of a peak correlation value is determined from the generated correlation values. An initial phase offset is determined from the estimate of the peak correlation value. A frequency offset is then determined from the initial phase offset. A frequency offset compensation is determined based on the frequency offset and based on bias introduced by quantization. The first quantized samples of the received signal are then adjusted based on the frequency offset compensation.

In yet other embodiments, compensation for the frequency error in the received signal includes generating first quantized samples of the received signal, generating second quantized samples of the received signal based on the first quantized samples, wherein each second quantized sample comprises a 1-bit real part and a 1-bit imaginary part. Correlation values are generated by correlating the second quantized samples of the received signal with the second quantized samples of a delayed received signal. An initial estimate of a peak correlation value is determined from the generated correlation values. An initial phase offset is determined from the initial estimate of the peak correlation value. The first quantized samples of the received signal are adjusted by a frequency based on the initial phase offset, and adjusted second quantized samples of the received signal are generated based on the adjusted first quantized samples. New correlation values are generated by correlating the adjusted second quantized samples of the received signal with the adjusted second quantized samples of the delayed received signal. A new estimate of the peak correlation value is determined from the generated new correlation values. A new phase offset is determined from the new estimate of the peak correlation value. The first quantized samples of the received signal are then adjusted by a frequency based on the new phase offset.

BRIEF DESCRIPTION OF THE DRAWINGS

The objects and advantages of the invention will be understood by reading the following detailed description in conjunction with the drawings in which.

DETAILED DESCRIPTION

Figure 1:
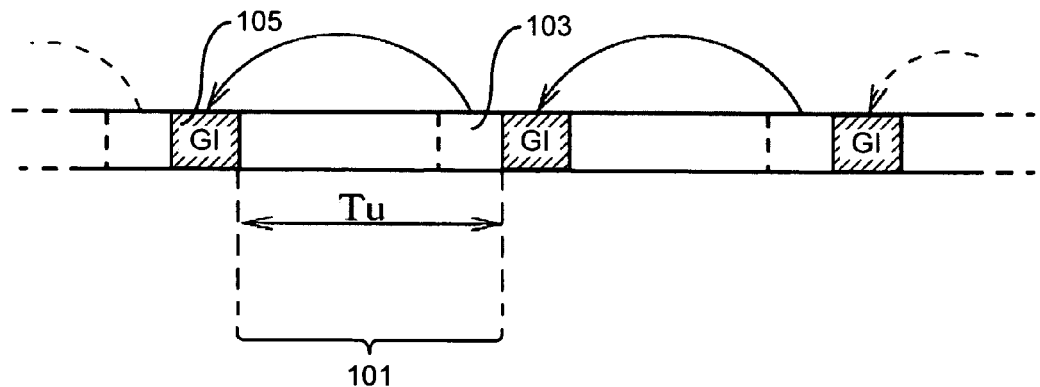
FIG. 1 is a schematic illustration of symbols separated by guard intervals in an orthogonal frequency division multiplexing (OFDM) system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Described herein are methods and apparatuses that are relevant to achieving coarse synchronization for both small and large values of $T_m$. Methods and apparatuses for estimating $T_m$ are also disclosed. Knowledge of $T_m$ is useful both for placing the FFT window and for the algorithms used for channel estimation. Further described herein are methods and apparatuses for accurately estimating the signal-to-noise ratio (SNR) on the channel. Knowledge of the SNR is useful in the digital domain, for example for calculating different weighting functions. In the analog part of the receiver, knowledge of the SNR is useful for automatic gain control (AGC).

More particularly, a number of techniques are disclosed for achieving initial estimation of several parameters when OFDM transmissions are received. A first technique can be used to estimate time and frequency offset. If desirable, this technique also enables the maximum delay spread of the channel to be estimated. A second technique can be used (with or without first applying the first technique) to generate an improved estimate for synchronization time and delay spread, as well as for estimating the SNR on the channel. The second technique may be used without first applying the first technique (or its equivalent) whenever the frequency offset does not need to be estimated and adjusted.

For embodiments in which both techniques are applied, similarities between the two techniques allow the second technique to be included with only a minimum of added complexity. Additional embodiments are disclosed that give accurate results even if the input to the techniques is quantized to 1 bit in each of the in-phase (I) and quadrature-phase (Q) channels. These latter embodiments allow for implementations that require a minimum of memory and are computationally effective.

To facilitate the discussion, the various aspects are described with respect to embodiments that are in accordance with data taken from the standard for terrestrial Digital Video Broadcasting (DVB). These standards are set forth in ETSI EN 300 744 V.1.4.1 (2001-01), Digital Video Broadcasting (DVB); Framing structure, channel coding and modulation for digital terrestrial television. These specific parameters are only taken to more easily explain the embodiments, and are by no means restrictive or limiting.

Accordingly, it is assumed in the following embodiments that the duration, $T_u$, of the information carrying part of an OFDM symbol is equal to 896 μs, and that the length of the GI is $T_u/4=224$ μs. To highlight the merits of the invention, the performance of the several disclosed algorithms are compared to that of the conventional approach, that is, the one that bases synchronization on the peak at the output of the correlator. Henceforth, a generalized version (i.e., $T_B=x \cdot T_G$, wherein $T_G$ is the duration of the guard interval and $0 \leq x \leq 0.5$) of the conventional approach (which lets $x=\frac{1}{2}=0.5$) is denoted "Algorithm 0", whereas two of the herein-described techniques are denoted "Algorithm 1" and "Algorithm 2", respectively.

Figure 6:
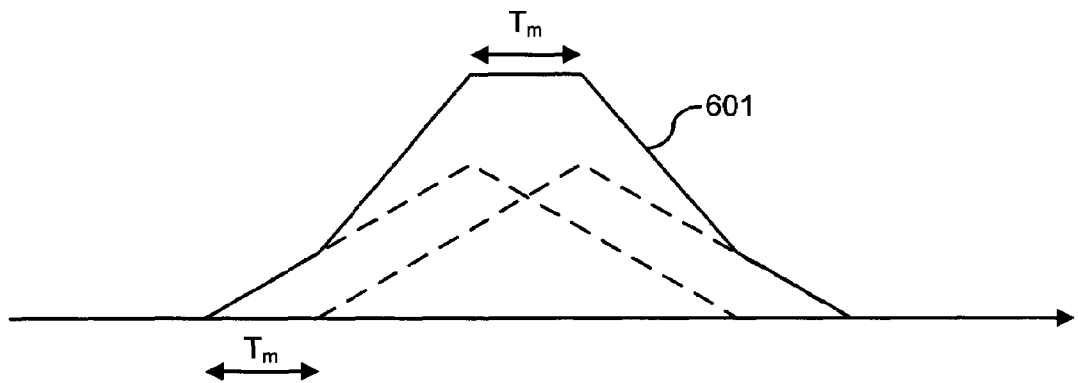
FIG. 6 illustrates an exemplary output, |corr(n)|, of a conventional correlator.

For the first algorithm to be described (Algorithm 1), it will be assumed that the impulse response of the channel consists of two dominant paths of equal strength, whose separation in time is $T_m$. The output 601 of a conventional correlator (e.g., the correlator illustrated in FIG. 3) is illustrated in FIG. 6.

To improve on the synchronization performance, the various embodiments do not just rely on the peak value at the correlator output, but instead make use of the fact that the correlation peak is relatively symmetric. Let $PW_X$ denote the peak width where the correlator output is more than X % of the peak value. The peak width, $PW_X$, represents a duration in time that begins at a first moment in time and ends at a second moment in time. (As used here, the terms "first" and "second" are merely enumerative rather than temporal, and do not indicate whether there are intervening moments in time between the first and second moments in time.) Referring to FIG. 6, it can be seen that, for the general case $$T_m \approx 2PW_{100-\Delta X} - PW_{100-2\Delta X} \quad (2)$$

for X>50%. For situations in which X is set such that $PW_{100-2\Delta X}$ lies at or above the point where the slope of the correlator output 601 changes, Equation (2) becomes an equality instead of merely an approximation (i.e., $T_m=2PW_{100-\Delta X}-PW_{100-2\Delta X}$). Thus, equation (2) enables one to estimate the delay spread of the channel.

In accordance with another aspect, a point (e.g., a mid-point) along the interval during which the correlation value exceeds a predetermined level (e.g., 80%) is taken as the estimated position of the correlation peak. This gives considerably lower variance, especially in SFNs.

To get some feeling for what value of X would be reasonable for estimating the peak position as well as for estimating $T_m$ according to Equation (2), some simulations were run for two different channel models: the two-tap model (corresponding to SFN as described above) and a channel whose multi-path characteristic exhibits a uniform delay profile. The results for some different channel conditions are given in Tables 1 and 2. Mean values as well as standard deviation (indicated in brackets) are given in μs.

TABLE 1

Position of correlation peak when estimated using different definitions of peak width. SNR = 10 dB.

| Ch. par. | X | | | | |
|---|---|---|---|---|---|
| | 95% | 90% | 80% | 70% | 60% |
| Tm = 10 μs | 4.9 (1.5) | 4.9 (2.1) | 4.9 (2.9) | 4.9 (3.7) | 4.9 (4.4) |
| Tm = 10 μs, SFN | 4.9 (1.3) | 4.8 (1.8) | 4.7 (2.5) | 4.7 (3.0) | 4.6 (3.5) |
| Tm = 100 μs | 49 (3.0) | 50 (2.8) | 51 (3.1) | 51 (3.5) | 51 (3.8) |
| Tm = 100 μs, SFN | 50 (3.0) | 50 (2.5) | 50 (2.8) | 50 (3.2) | 50 (3.4) |

TABLE 2

Estimated maximum delay spread for two different choices of X. SNR = 10 dB.

| Channel Parameter | X = 90% | X = 80% |
|---|---|---|
| $T_m$ = 10 μs | 2.7 (3.4) | 2.3 (5.1) |
| $T_m$ = 10 μs, SFN | 8.3 (4.4) | 8.2 (6.5) |
| $T_m$ = 100 μs | 22 (3.3) | 20 (4.5) |
| $T_m$ = 100 μs, SFN | 94 (3.0) | 94 (5.8) |

Based on the results presented in Tables 1 and 2, the 80% and 90% levels will be selected for use in estimating the peak position and $T_m$. As can be seen in Table 2, the estimate of $T_m$ is poor in the case of a uniform delay profile. The reason is because the output of the correlator does not show a pronounced plateau, but is instead more like a peak. As a result, $T_m$ is severely underestimated.

Now, even though $T_m$ might be estimated, this might or might not be used when placing the FFT window. In case an estimate of $T_m$ is not used, the bias term is the same as for the Algorithm 0, that is, $x \cdot T_G$, wherein $0 \leq x \leq 0.5$. The algorithm comprising estimating the position of the correlation peak based on the mid-point of the interval during which the correlation value exceeds a predetermined level and then using $T_B=x \cdot T_G$ ($0 \leq x \leq 0.5$, for example $T_B=T_G/2$) as the bias term for determining synchronization timing (e.g., for placement of the FFT window) is herein denoted "Algorithm 1a" in what follows. In case $T_m$ is estimated, one can be a bit more aggressive by letting $T_B=T_G-x \cdot T_m$ ($0.5 \leq x \leq 1$, for example $T_B=T_G-T_m/2$) when estimating the starting point for the OFDM symbol. The algorithm comprising estimating the position of the correlation peak based on the mid-point of the interval during which the correlation value exceeds a predetermined level and using $T_B=T_G-T_m/2$ as the bias term is herein denoted Algorithm 1b.

Figure 7:
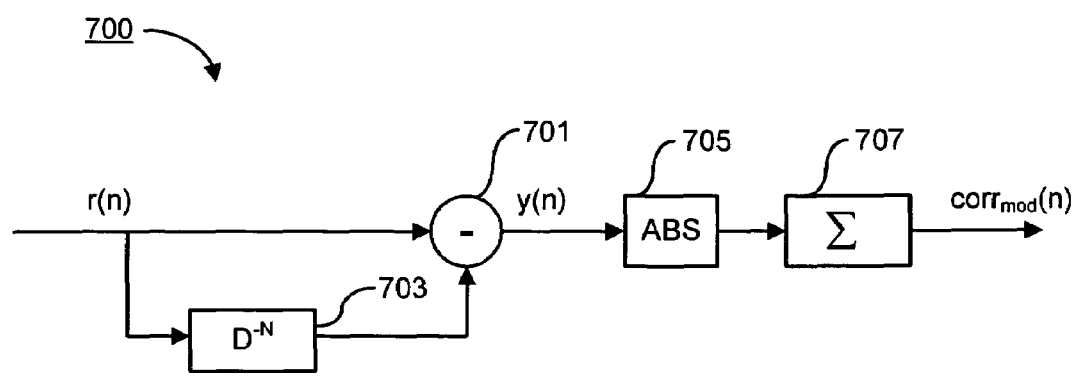
FIG. 7 is a block diagram of a correlator in accordance with an aspect of the invention.

In yet another alternative, improved performance is obtained by means of a modified correlator such as the modified correlator 700 depicted in FIG. 7. A method for utilizing the modified correlator 700 is illustrated in the flowchart of FIG. 8.

Figure 3:
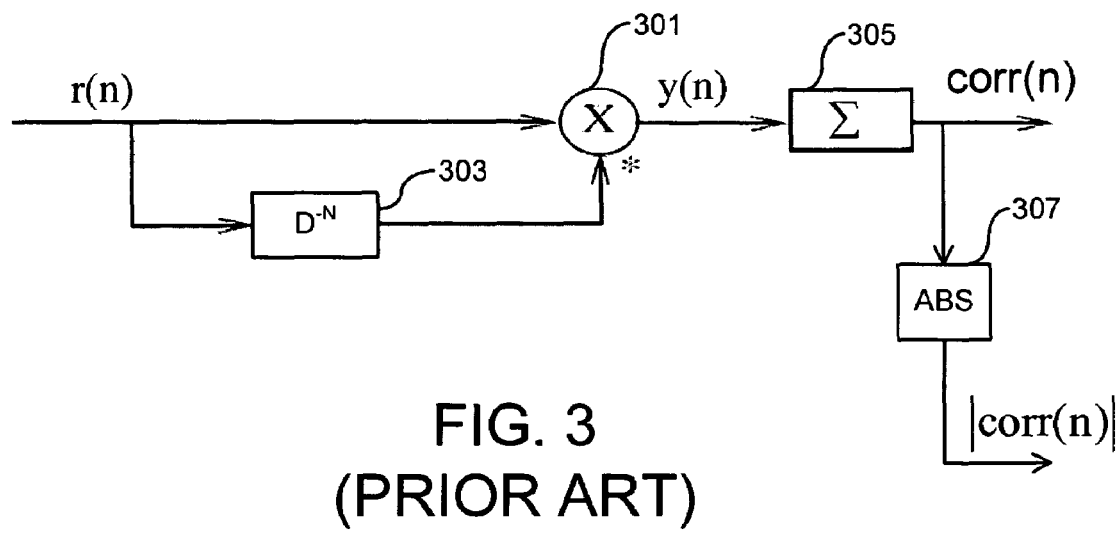
FIG. 3 is a block diagram of a conventional correlator that can be used to find the start of a symbol.
Figure 4:
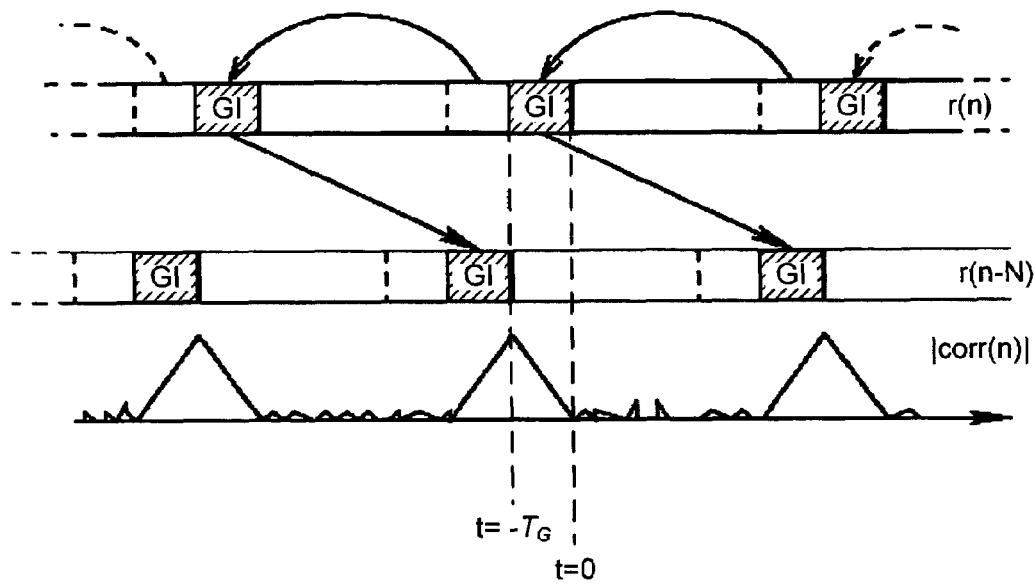
FIG. 4 is a timing diagram that illustrates the relationship between the received signal, a delayed signal, and the moving sum, |corr(n)|, for an ideal situation in which the channel has no associated delay spreading.
Figure 5:
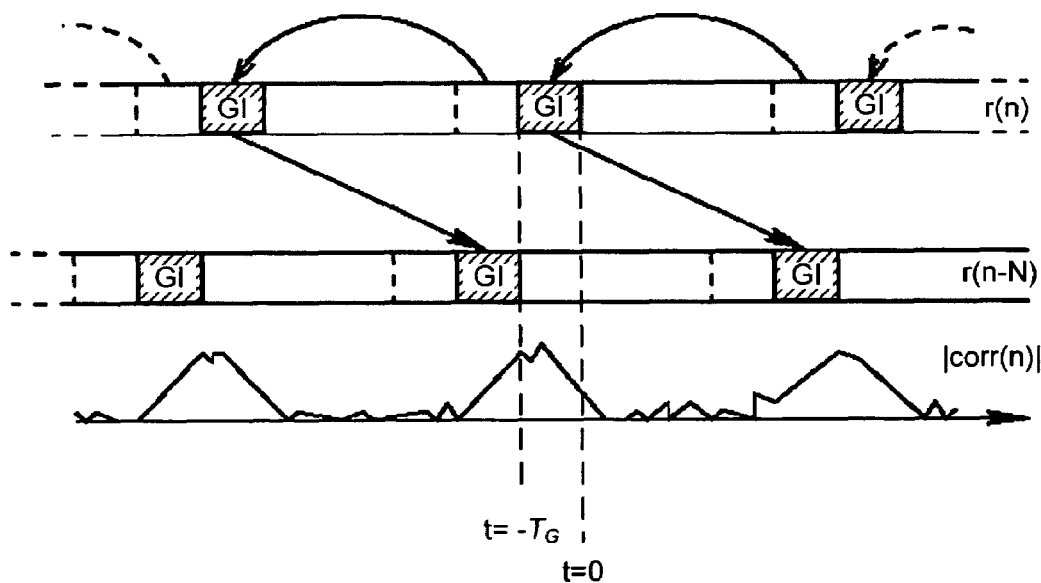
FIG. 5 is a timing diagram that illustrates the relationship between the received signal, a delayed signal, and the moving sum, |corr(n)|, for a situation in which the channel has a moderate amount of delay spreading.

It can be seen from a comparison of the new modified correlator 700 with a conventional correlator such as the one depicted in FIG. 3 that a subtractor 701 replaces the multiplier 301. The delay unit 703 and summing unit 707 operate in a manner described above with respect to the delay unit 303 and summing unit 305. An absolute value unit 705 is interposed between the subtractor 701 and the summing unit 707, so that the summing unit 707 operates on the absolute values of the outputs of the subtractor 701. It will be observed that, in the modified correlator 700, there is no need to generate the complex conjugate of the signal supplied at the output of the delay unit 703.

For the modified correlator 700 to be most useful, the fractional frequency offset should be discarded (e.g., through compensation) from the received signal. Of course, if the received signal is known not to have a fractional frequency offset, then this step may be omitted. The difference between a frequency offset and a fractional frequency offset is as follows. The frequency error can be written as $n \cdot \Delta F + \Delta f_F$, where $\Delta f_F$ is the distance between the carriers in the OFDM signal, $\Delta f_F$ is the fractional frequency offset, n is an integer, and $-\Delta F/2 < \Delta f_F \leq \Delta_F/2$. When performing frequency estimation prior to the FFT (i.e., what is done using, for example, Algorithm 0), one estimates $\Delta f_F$ and removes it. This is sufficient to prevent FFT leakage. If n is not zero, this means that after the FFT, there is a shift in where the symbols show up. If n=1, it means that there is a shift of one, if n=2 it means that there is a shift of two, and so on. It is therefore necessary to estimate n, but this is done using algorithms that are run after the FFT, and which are not related to the various aspects of the invention. For more information about such algorithms, the interested reader may refer to Speth et al., "Optimum Receiver Design for OFDM-Based Broadband Transmission—Part II: A Case Study", IEEE TRANSACTIONS ON COMMUNICATIONS, vol. 49, no. 4, April 2001.

Figure 8:
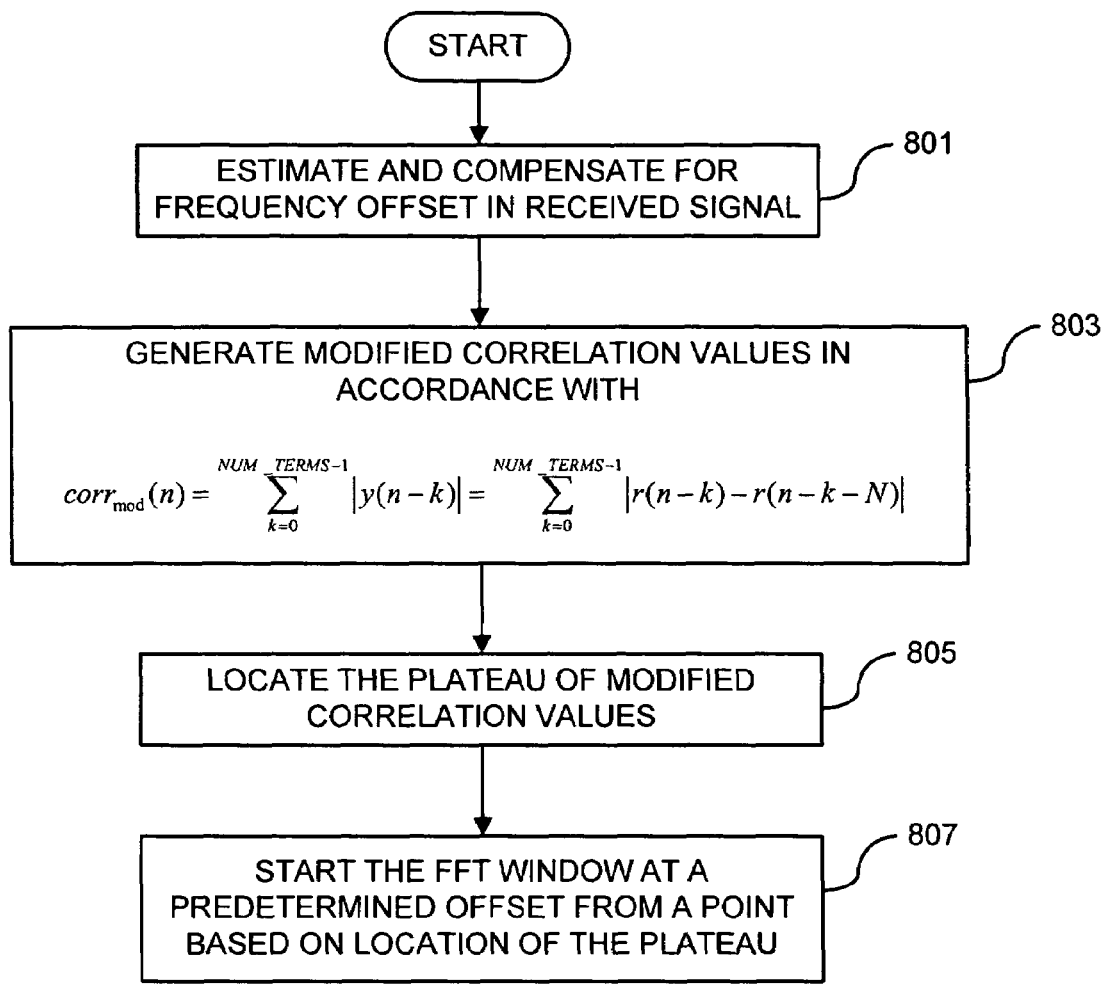
FIG. 8 is a flow diagram illustrating an exemplary technique for utilizing the correlator of FIG. 7 in accordance with another aspect of the invention.

Referring now to FIG. 8, the fractional frequency offset of the received signal should be estimated and compensated for (801). This can be performed by means of conventional techniques. Alternatively, the necessary information about the frequency offset can be obtained by performing either of the Algorithms 1a or 1b, described above.

After the fractional frequency offset has been removed from the received signal, the resultant signal is supplied to the modified correlator 700. The number of terms in the moving sum should not correspond to a time interval larger than $T_G - T_m$, but should still correspond to a time interval large enough to ensure that the noise is sufficiently averaged out. Thus, for each sample r(n), a modified correlation value, $corr_{mod}(n)$, is generated (803) in accordance with:

$$corr_{mod}(n) = \sum_{k=0}^{NUM\_TERMS-1} |y(n-k)| \quad (3)$$
$$= \sum_{k=0}^{NUM\_TERMS-1} |r(n-k) - r(n-k-N)|$$

where NUM_TERMS is the number of terms in the moving sum.

Figure 9:
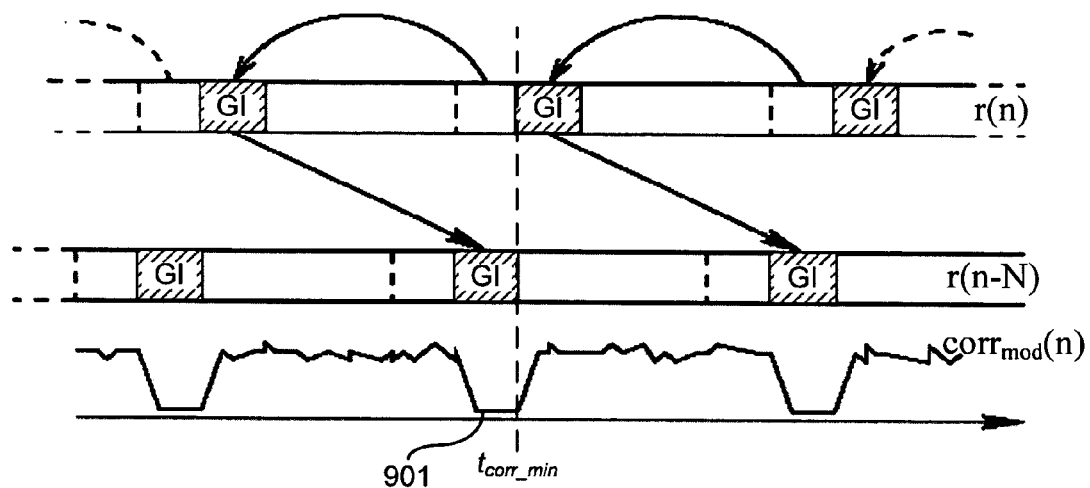
FIG. 9 depicts an exemplary output from the correlator of FIG. 7 when there is no time dispersion.
Figure 10:
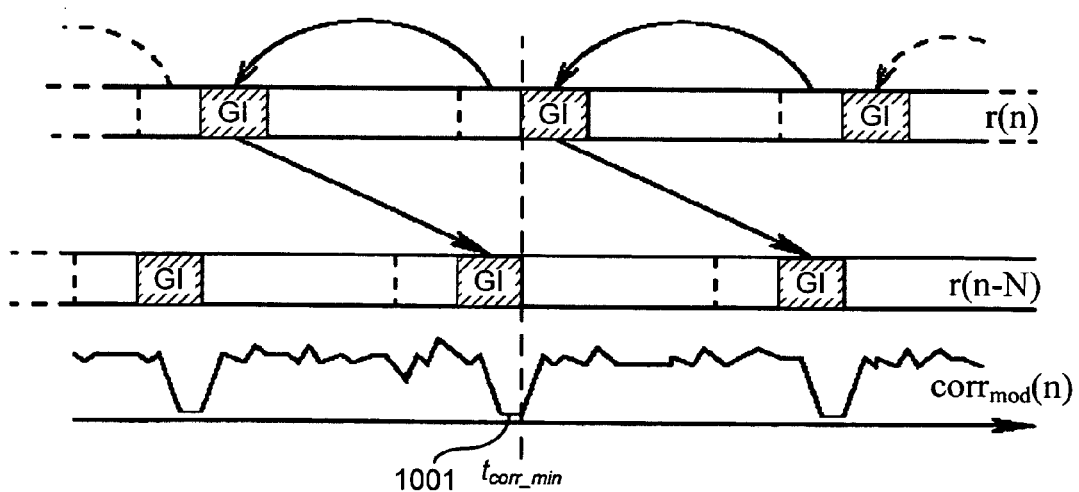
FIG. 10 depicts an exemplary output from the correlator of FIG. 7 when the time dispersion of the channel, is equal to half the length of the guard interval.

FIGS. 9 and 10 show what the output of the new modified correlator 700 might look like for the cases $T_m = 0$ and $T_m \approx T_G/2$, respectively.

For the new modified correlator 700, the goal is to locate the plateau 901, 1001 where the output is minimum (805), and preferably the point where the correlator output starts to increase from its minimum value, since this is the point in time where the GI of a new symbol enters the correlator. In FIGS. 9 and 10, these preferred points are illustrated at time $t_{corr\_min}$. The optimum location for placing the FFT window is then simply found at a time $T_G$ later (807), irrespective of the actual value of $T_m$.

There are a number of possible techniques for determining when the output of the correlator has started to increase. One is to find the minimum correlation value and to take the start of the increase as the point where the correlator value has increased by a certain amount, or by a certain percentage of the minimum value. One might then determine a suitable amount or percentage by, for example, running simulations. The position of the starting point of the FFT window may then be taken for example as the point where the correlator output starts to increase plus $xT_G$, where $0.5 \leq x \leq 1$.

An alternative technique for locating the plateau 901, 1001 includes finding the minimum and maximum values of $corr_{mod}(n)$ (i.e., the output of the modified correlator 700). The positions where the output from the correlator exceeds the minimum value by a predetermined percentage, X, of the difference between the maximum and minimum values are used to define an "X % plateau," which is herein denoted $PW_X$. The midpoint of this plateau is found, and the position of the starting point of the FFT window is taken for example as the midpoint of the $PW_X$ plateau plus $xT_G$, where $1.0 \leq x \leq 1.5$. In the numerical examples provided below, X is chosen as 10, so that the positions where the output from the modified correlator 700 exceeds the minimum value by $0.1 \cdot (\max(corr_{mod}(n)) - \min(corr_{mod}(n)))$ are located. The width of this "10% plateau" is henceforth denoted $PW_{10}$. It will be recognized that in other embodiments, a percentage, X, other than 10% could be used.

The position for the FFT window is taken as the midpoint of the X % plateau plus $T_G$. This technique for determining the position of the FFT window is herein denoted "Algorithm 2a."

It is also possible to use the output of the new modified correlator 700 to estimate the delay spread in order to further improve the placement of the FFT window. In particular, it will be recognized that $T_G$ corresponds to the time span between r(n) and r(n−N) when these signal values are (ideally) equal. If the number of terms in the correlator's summation corresponds to time $T_{Num\_Terms}$, this is how long it takes $corr_{mod}(n)$ to reach its minimum value starting from the time when r(n) and r(n−N) are equal. Now the delay spread, $T_m$, has the effect of lessening the time where r(n) and r(n−N) are equal because information from outside the guard interval spills over into the guard interval. Consequently, it can be seen that the width of the plateau equals $T_G - T_m - T_{Num\_Terms}$. Denoting the width of the actual plateau 901, 1001 by $PW_0$, it then follows that the delay spread can be estimated as $$\hat{T}_m = (T_G - T_{Num\_Terms} - PW_0). \quad (4)$$

For the specific case in which $T_G = 224$ μs and $T_{Num\_Terms} = T_G/4 = 56$ μs, Equation (4) becomes:

$$\hat{T}_m = (168 - PW_0) \mu s. \quad (5)$$

The above-described technique whereby the X % plateau (e.g., $PW_{10}$) is used to estimate $T_m$ is herein denoted "Algorithm 2b." We will now examine the specific case in which $PW_{10}$ rather than $PW_0$ is used. In addition, because Equation (5) was based on the assumption of no noise, a relation between delay spread and $PW_{10}$ can be established by evaluating $PW_{10}$ for different values of $T_m$ for the case of a two-ray channel (which seems to be the best model in case of large values of $T_m$), and then making a least squares (LS) fit. As a result, it is found that if the length of the summation corresponds to $T_G/4$, then $$\hat{T}_m = \frac{1}{0.96}(182 - PW_{10}) \mu s \quad (6)$$

The FFT window is then placed in a similar way as was the case in Algorithm 2a, but with a correction factor that depends on $PW_{10}$, that is, effectively by using knowledge of the delay spread of the channel. The position of the starting point of the FFT window may then be taken for example as the midpoint of the plateau plus $T_B$, where $T_B = 3T_G/2 - T_{NUM\_TERMS}/2 - x \cdot \hat{T}_m$ and $0.5 \leq x \leq 1.0$.

Another nice property of the new correlation technique (e.g., using the modified correlator 700 of FIG. 7) is that the output can be used with relative ease to estimate the SNR on the channel. To see this, note that $$y(n) = r(n) - r(n-N) = s(n) + n(n) - s(n-N) - n(n-N), \quad (7)$$

where s(n) represents the desired signal in the received signal r(n), and n(n) represents the noise component in the received signal r(n).

There are two different cases to be considered, namely $s(n)=s(n-N)$ and $s(n) \neq s(n-N)$. To proceed, the signal can be accurately modeled as a complex Gaussian function because the transmitted signal comprises a combination of a large number of independent information streams. Let $\sigma_s^2$ denote the power of the desired signal, and let $\sigma_n^2$ denote the noise power. Since all the terms are Gaussian, it follows that so is y(n), and consequently |y(n)| will be Rayleigh distributed. Since y(n) has a zero mean value, its power is equal to its variance.

It can be shown that for a complex Gaussian variable z with variance $\sigma^2$, $$E[|z|] = \frac{\sqrt{\pi}}{2}\sigma. \quad (8)$$

As a consequence, for the case where $s(n)=s(n-N)$ we obtain $$E[|y|] = \sqrt{\frac{\pi}{2}} \sigma_n, \quad (9)$$

whereas in the case where $s(n) \neq s(n-N)$ we get $$E[|y|] = \sqrt{\frac{\pi}{2}} \sqrt{\sigma_s^2 + \sigma_n^2}. \quad (10)$$

Therefore, letting $y_{max}$ and $y_{min}$ denote the value of $E[|y|]$ where $s(n) \neq s(n-N)$ and $s(n)=s(n-N)$, respectively, one obtains $$SNR = \frac{\sigma_s^2}{\sigma_n^2} = \left(\frac{y_{max}}{y_{min}}\right)^2 - 1. \quad (11)$$

It is noted that for large values of SNR, the "−1" term becomes insignificant, yielding yet another approximation:

$$SNR = \frac{\sigma_s^2}{\sigma_n^2} = \left(\frac{y_{max}}{y_{min}}\right)^2.$$

Just using one sample for $y_{max}$ and $y_{min}$, respectively, would give a very noisy estimate of the SNR. Now, returning to the modified correlator, it is therefore readily seen that the output of the correlator can be used to find a more accurate SNR estimate, since NUM_TERMS terms are added. Specifically, let $corr_{max}$ and $corr_{min}$ denote the cases where all inputs correspond to $y_{max}$ and $y_{min}$, respectively. Then, the SNR can be estimated as $$\widehat{SNR} = \left(\frac{corr_{max}}{corr_{min}}\right)^2 - 1,$$

or, alternatively using the approximation, $$\widehat{SNR} = \left(\frac{corr_{max}}{corr_{min}}\right)^2.$$

The respective performances of Algorithms 0, 1a, 1b, 2a, and 2b under different channel conditions are compared in Tables 3-7 below. In each of the tables, the optimum position for the FFT window is taken to be at t=0. Therefore, referring to Equation (1), ISI-free reception is achieved if the error of the FFT window position is $$-T_G + T_m \leq FFT \text{ pos error} \leq 0. \quad (12)$$

In each of Tables 3-7, $T_G$=224 μs. Each of the table entries is based on 1000 simulations. One hundred different channels were generated, and for each of those channels, 10 correlations with the associated estimations were performed.

Two different models for the delay profile were considered. The first one is a two-ray channel where the distance between the taps is $T_m$. The two taps have the same power, but the phase is randomly chosen from a uniform distribution. In the second channel model, a uniform delay profile is assumed, that is, a relatively large number of taps (e.g., 40 or so) are placed between 0 and $T_m$. It is believed that this is an acceptable model for small values of $T_m$, but unrealistic for larger values of $T_m$. Still it gives an indication of the robustness of the algorithms.

For both Algorithm 0 and Algorithm 1a, it follows that the expected error in the placement of the FFT is given by $$E[FFT \text{ pos error}] = \frac{1}{2}(-T_G + T_m). \quad (13)$$

It is easy to see that this corresponds to placing the FFT window in the middle of the ISI-free part of the GI.

For Algorithm 2a, assuming that the center of the plateau is found, it can be shown that the expected error in the placement of the FFT is given by $$E[FFT \text{ pos error}] = \frac{1}{2}\left(-\frac{3}{4}T_G + T_m\right), \quad (14)$$

where the factor ¾ is a consequence of the summation corresponding to ¼·$T_G$.

The simulation results will now be presented in Tables 3-7. In Table 3, which follows, the channel is flat (i.e., $T_m$=0 μs) and SNR=10 dB.

TABLE 3

Statistics for the position where the FFT window is placed compared to the optimum position. The channel is flat (i.e., $T_m = 0\mu$) and SNR = 10 dB.

|  | Alg 0 | Alg 1a | Alg 1b | Alg 2a | Alg 2b |
|---|---|---|---|---|---|
| E[freq. error] Hz | 0.0 | As Alg 0 | As Alg 0 | N/A | N/A |
| std[freq. error] Hz | 1.3 | As Alg 0 | As Alg 0 | N/A | N/A |
| E[FFT pos error] µs | −112 | −112 | 0.0 | −84 | −4.9 |
| std[FFT pos error] µs | 0.2 | 1.4 | 2.5 | 0.5 | 0.8 |
| Max[FFT pos error] µs | −111 | −106 | 6.8 | −82 | −2.6 |
| Min[FFT pos error] µs | −113 | −118 | −8.5 | −87 | −7.5 |
| E[$T_m$ est.] µs | N/A | N/A | 0.0 | N/A | 3.8 |
| std[$T_m$ est.] µs | N/A | N/A | 4.1 | N/A | 1.2 |
| E[SNR est.] dB | N/A | N/A | N/A | 10.4 | As Alg 2a |
| std[SNR est.] dB | N/A | N/A | N/A | 0.3 | As Alg 2a |

In Table 4, which follows, the channel has two taps, $T_m$=10 µs and SNR=10 dB.

TABLE 4

Statistics for the position where the FFT window is placed compared to the optimum position. The channel has two taps, $T_m = 10$ µs and SNR = 10 dB.

|  | Alg 0 | Alg 1a | Alg 1b | Alg 2a | Alg 2b |
|---|---|---|---|---|---|
| E[freq. error] Hz | 0.0 | As Alg 0 | As Alg 0 | N/A | N/A |
| std[freq. error] Hz | 1.4 | As Alg 0 | As Alg 0 | N/A | N/A |
| E[FFT pos error] µs | −107 | −107 | 0.8 | −79 | −1.7 |
| std[FFT pos error] µs | 3.6 | 1.8 | 2.8 | 0.8 | 1.2 |
| Max[FFT pos error] µs | −101 | −101 | 9.9 | −76 | 1.9 |
| Min[FFT pos error] µs | −113 | −112 | −8.1 | −82 | −5.5 |
| E[$T_m$ est.] µs | N/A | N/A | 8.3 | N/A | 7.3 |
| std[$T_m$ est.] µs | N/A | N/A | 4.4 | N/A | 1.7 |
| E[SNR est.] dB | N/A | N/A | N/A | 10.4 | As Alg 2a |
| std[SNR est.] dB | N/A | N/A | N/A | 0.3 | As Alg 2a |

In Table 5, which follows, the channel has two taps, $T_m$=100 µs and SNR=10 dB.

TABLE 5

Statistics for the position where the FFT window is placed compared to the optimum position. The channel has two taps, $T_m = 100$ µs and SNR = 10 dB.

|  | Alg 0 | Alg 1a | Alg 1b | Alg 2a | Alg 2b |
|---|---|---|---|---|---|
| E[freq. error] Hz | −0.1 | As Alg 0 | As Alg 0 | N/A | N/A |
| std[freq. error] Hz | 2.6 | As Alg 0 | As Alg 0 | N/A | N/A |
| E[FFT pos error] µs | −62 | −62 | 2.9 | −34 | −1.4 |
| std[FFT pos error] µs | 35 | 2.4 | 3.2 | 0.9 | 1.3 |
| Max[FFT pos error] µs | −12 | −55 | 13.1 | −32 | 2.8 |
| Min[FFT pos error] µs | −112 | −69 | −6.0 | −37 | −6.1 |
| E[$T_m$ est.] µs | N/A | N/A | 94 | N/A | 101 |
| std[$T_m$ est.] µs | N/A | N/A | 4.1 | N/A | 1.8 |
| E[SNR est.] dB | N/A | N/A | N/A | 10.3 | As Alg 2a |
| std[SNR est.] dB | N/A | N/A | N/A | 0.3 | As Alg 2a |

In Table 6, which follows, the channel has a uniform delay profile, $T_m$=10 µs and SNR=10 dB.

TABLE 6

Statistics for the position where the FFT window is placed compared to the optimum position. The channel has a uniform delay profile, $T_m = 10$ µs and SNR = 10 dB.

|  | Alg 0 | Alg 1a | Alg 1b | Alg 2a | Alg 2b |
|---|---|---|---|---|---|
| E[freq. error] Hz | 0.0 | As Alg 0 | As Alg 0 | N/A | N/A |
| std[freq. error] Hz | 1.4 | As Alg 0 | As Alg 0 | N/A | N/A |
| E[FFT pos error] µs | −107 | −107 | 2.5 | −79 | 0.7 |
| std[FFT pos error] µs | 1.5 | 1.9 | 3.3 | 0.8 | 1.1 |
| Max[FFT pos error] µs | −103 | −99 | 14 | −77 | 3.0 |
| Min[FFT pos error] µs | −112 | −115 | −7.1 | −82 | −4.2 |
| E[$T_m$ est.] µs | N/A | N/A | 4.6 | N/A | 5.3 |
| std[$T_m$ est.] µs | N/A | N/A | 5.3 | N/A | 1.5 |
| E[SNR est.] dB | N/A | N/A | N/A | 10.4 | As Alg 2a |
| std[SNR est.] dB | N/A | N/A | N/A | 0.3 | As Alg 2a |

In Table 7, which follows, the channel has a uniform delay profile, $T_m$=100 µs and SNR=10 dB.

TABLE 7

Statistics for the position where the FFT window is placed compared to the optimum position. The channel has a uniform delay profile, $T_m = 100$ µs and SNR = 10 dB.

|  | Alg 0 | Alg 1a | Alg 1b | Alg 2a | Alg 2b |
|---|---|---|---|---|---|
| E[freq. error] Hz | 0.0 | As Alg 0 | As Alg 0 | N/A | N/A |
| std[freq. error] Hz | 2.0 | As Alg 0 | As Alg 0 | N/A | N/A |
| E[FFT pos error] µs | −60 | −61 | 28 | −34 | 14 |
| std[FFT pos error] µs | 9.5 | 5.5 | 7.0 | 3.1 | 4.1 |
| Max[FFT pos error] µs | −34 | −45 | 59 | −26 | 31 |
| Min[FFT pos error] µs | −87 | −76 | 9.1 | −46 | 4.1 |
| E[$T_m$ est.] µs | N/A | N/A | 46 | N/A | 68 |
| std[$T_m$ est.] µs | N/A | N/A | 7.7 | N/A | 5.5 |
| E[SNR est.] dB | N/A | N/A | N/A | 10.3 | As Alg 2a |
| std[SNR est.] dB | N/A | N/A | N/A | 0.3 | As Alg 2a |

Based on the information contained in the above-presented Tables 3-7, the following observations can be made:

The accuracy of the frequency estimate is very good, and this should be no problem.

Algorithm 1a performs significantly better than Algorithm 0.

Both Algorithm 1b and Algorithm 2b show very good performance, with a slight edge for the latter. The position error of the FFT window is only 1-2% of the length of the GI.

Using Algorithm 2 to estimate the SNR gives very good results, and this is essentially independent of the delay spread of the channel.

In practice, the algorithms will, of necessity, be implemented with finite precision, using a suitable number of bits. Clearly, there is a trade-off between using many bits to obtain good performance and using few bits to obtain an implementation having low complexity. In another aspect, it will now be shown how any of the above algorithms (including the conventional approach, Algorithm 0) can be implemented using only 1 bit resolution in each of the I and Q phases at a cost of only a small implementation loss. For the case in which information is quantized in only 1 bit, the quantized input, $r^q$, equals $$r^q(n) \in \{\pm 1 \pm i\} \quad (15)$$

where the quantization level of r(n) is chosen only as a matter of convenience.

Considering frequency estimation, where either Algorithm 0 or Algorithm 1 may be used, we let $$y^q(n) = 0.5 \cdot (r^q(n) \cdot (r^q(n-N))^*) \quad (16)$$

where the factor 0.5 is introduced only to normalize $y^q(n)$. It follows that $y^q(n) \in \{1, i, -1, -i\}$.

Now, suppose that there is no noise and that the fractional frequency offset is denoted $\Delta f_F$. Then it follows that, for the non-quantized signal, we have $$r(n) = r(n-N)e^{-\Delta\phi}, \quad (17)$$

where $\Delta\phi = 2\pi\Delta f_F T_u$ and $T_u$ is the delay corresponding to N samples. Thus, it follows that to estimate $\Delta f_F$, one simply uses this relation and $\Delta\phi$.

Suppose the same thing is done using $r^q(n)$, and for the moment suppose that $0 \leq \Delta\phi < \pi/2$. It is then readily seen that $y^q(n)$ will either be 1 or i (recall that it was assumed that there was no noise present), depending on the phase of r(n–N). More precisely, it follows that $$E[\text{Re}(y^q(n))] = \frac{\pi/2 - \Delta\varphi}{\pi/2} \quad (18)$$

and $$E[\text{Im}(y^q(n))] = \frac{\Delta\varphi}{\pi/2}, \quad (19)$$

where Re(X) and Im(X) denote the real part and imaginary part of X, respectively. Let $\Delta\phi^q$ denote the phase of $\text{corr}^q(n)$, which is obtained as $$\arg(\text{corr}^q(n)) = \arctan\frac{\Sigma \text{Im}(y^q(n))}{\Sigma \text{Re}(y^q(n))}. \quad (20)$$

To proceed, suppose that the number of terms to generate $\text{corr}^q(n)$ is large so that the variance of $\Sigma\text{Im}(y^q(n))/\Sigma\text{Re}(y^q(n))$ is small enough for the arctan function to be considered as linear in the region of interest. Then we might write $$E[\Delta\varphi^q] = E\left[\arctan\frac{\Sigma \text{Im}(y^q(n))}{\Sigma \text{Re}(y^q(n))}\right] \quad (21)$$

$$\approx \arctan\frac{\Sigma[\text{Im}(y^q(n))]}{\Sigma[\text{Re}(y^q(n))]}$$

$$= \arctan\frac{\Delta\varphi}{\pi/2 - \Delta\varphi}$$

That is to say, depending on the value of $\Delta\phi$ ($0 \leq \Delta\phi < \pi/2$), the estimate will have a bias that depends on the actual value of $\Delta\phi$. Considering the different possibilities for $\Delta\phi$, the relations between $\Delta\phi$ and $\Delta\phi^q$ are shown in Table 8.

TABLE 8

The relation between the true phase offset, $\Delta\phi$, and the expected value of the phase offset if the input is quantized to 1bit, $E[\Delta\phi^q]$.

| Range for $\Delta\phi$ | Relation between $\Delta\phi^q$ and $\Delta\phi$ |
|---|---|
| $0 \leq \Delta\phi < \pi/2$ | $E[\Delta\varphi^q] = \arctan\frac{\Delta\varphi}{\pi/2 - \Delta\varphi}$ |
| $\pi/2 \leq \Delta\phi < \pi$ | $E[\Delta\varphi^q] = \arctan\frac{\pi - \Delta\varphi}{\pi/2 - \Delta\varphi}$ |
| $\pi \leq \Delta\phi < 3\pi/2$ | $E[\Delta\varphi^q] = \arctan\frac{\pi - \Delta\varphi}{\Delta\varphi - 3\pi/2}$ |
| $3\pi/2 \leq \Delta\phi < 2\pi$ | $E[\Delta\varphi^q] = \arctan\frac{2\pi - \Delta\varphi}{\Delta\varphi - 3\pi/2}$ |

Figure 11:
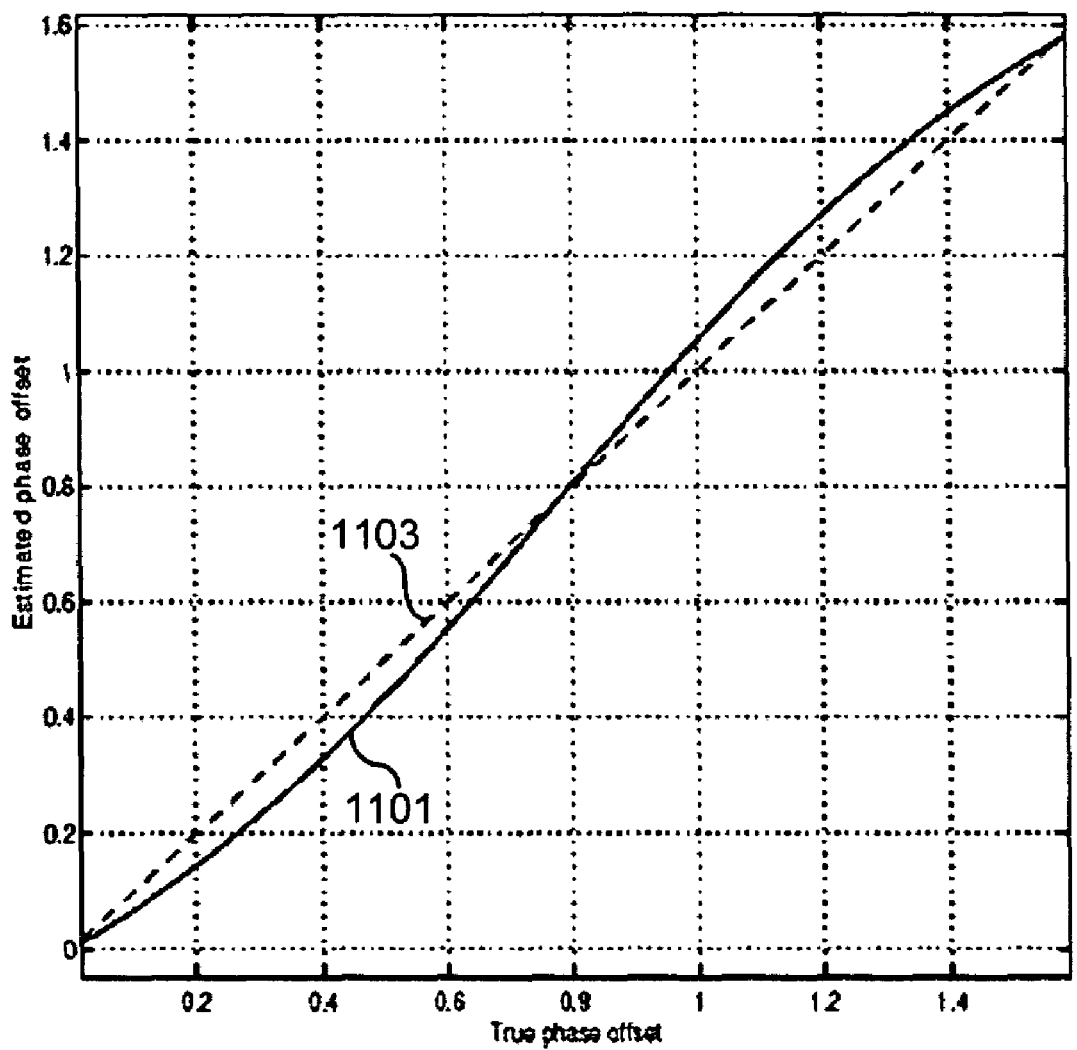
FIG. 11 depicts a first graph representing the estimated phase offset as a function of true phase offset; and a second graph depicting true phase offset as a function of itself.

FIG. 11 depicts a first graph 1101 representing the estimated phase offset, $E[\Delta\phi^q]$, as a function of true phase offset, $\Delta\phi$. To facilitate a comparison, also shown in FIG. 11 is a second graph 1103 depicting true phase offset, $\Delta\phi$, as a function of itself. For any given value of true phase offset on the horizontal axis, the distance between graphs 1101 and 1103 shows the estimate error. It is straightforward to show that the maximum bias is obtained for, for example $$\Delta\varphi = \frac{\pi}{4} - \sqrt{\frac{\pi}{4}\left(1 - \frac{\pi}{4}\right)} \approx 0.375, \quad (22)$$

and that the bias is between 0.071 and –0.071 rad, which equals 12.6 Hz and –12.6 Hz, respectively, for the 8k mode of operation specified in ETSI EN 300 744 V.1.4.1 (2001-01), "Digital Video Broadcasting (DVB); Framing structure, channel coding and modulation for digital terrestrial television."

In case the SNR is large, so that the effect of noise can be neglected, it would therefore be possible to take this bias into consideration when estimating the frequency error. For SNRs in the range of 5-10 dB, however, it turns out that the bias is reduced. Therefore the unbiased estimate will actually improve at these kinds of SNRs, whereas an estimate that is obtained by (erroneously) removing the expected bias will in fact give worse result. Another parameter that affects performance is the number of terms in the sum, that is, the length of the guard interval. Considering the standard deviation ("std") of the estimation error, the values (worst case frequency offset, specified in Hz) in Table 9 are obtained. The non-bracketed values correspond to the case without compensation for the bias, and the bracketed values correspond to the case with compensation for the bias.

TABLE 9

Standard deviation for frequency error (worst case frequency offset). Without compensation for the bias and with compensation for the bias (in parentheses).

| NUM_TERMS | 5 dB | 10 dB | 20 dB | 30 dB |
|---|---|---|---|---|
| 2048 | 5.5 (7.5) | 8.8 (4.1) | 12.1 (0.8) | 12.6 (0.2) |
| 1024 | 5.4 (7.6) | 9.1 (4.2) | 12.1 (0.9) | 12.4 (0.3) |
| 512 | 5.3 (7.7) | 9.1 (4.9) | 12.2 (0.9) | 12.8 (0.3) |
| 256 | 5.9 (7.9) | 9.2 (4.6) | 12.1 (1.0) | 12.4 (0.5) |
| 128 | 6.0 (7.8) | 8.4 (4.7) | 11.8 (1.6) | 12.4 (1.0) |

Based on the results in Table 9, the following observations are made:

If the SNR is 10 dB or more, then an improved frequency estimate is obtained by compensating for the bias, whereas if the SNR is as low as 5 dB, the model for the bias is so poor that an attempt to compensate actually results in a worse estimate.

For the case involving the shortest guard interval ($T_u/32$ does, for the 8 k mode, correspond to 8192/32=256 samples), the number of terms is sufficient to give good result.

Figure 12:
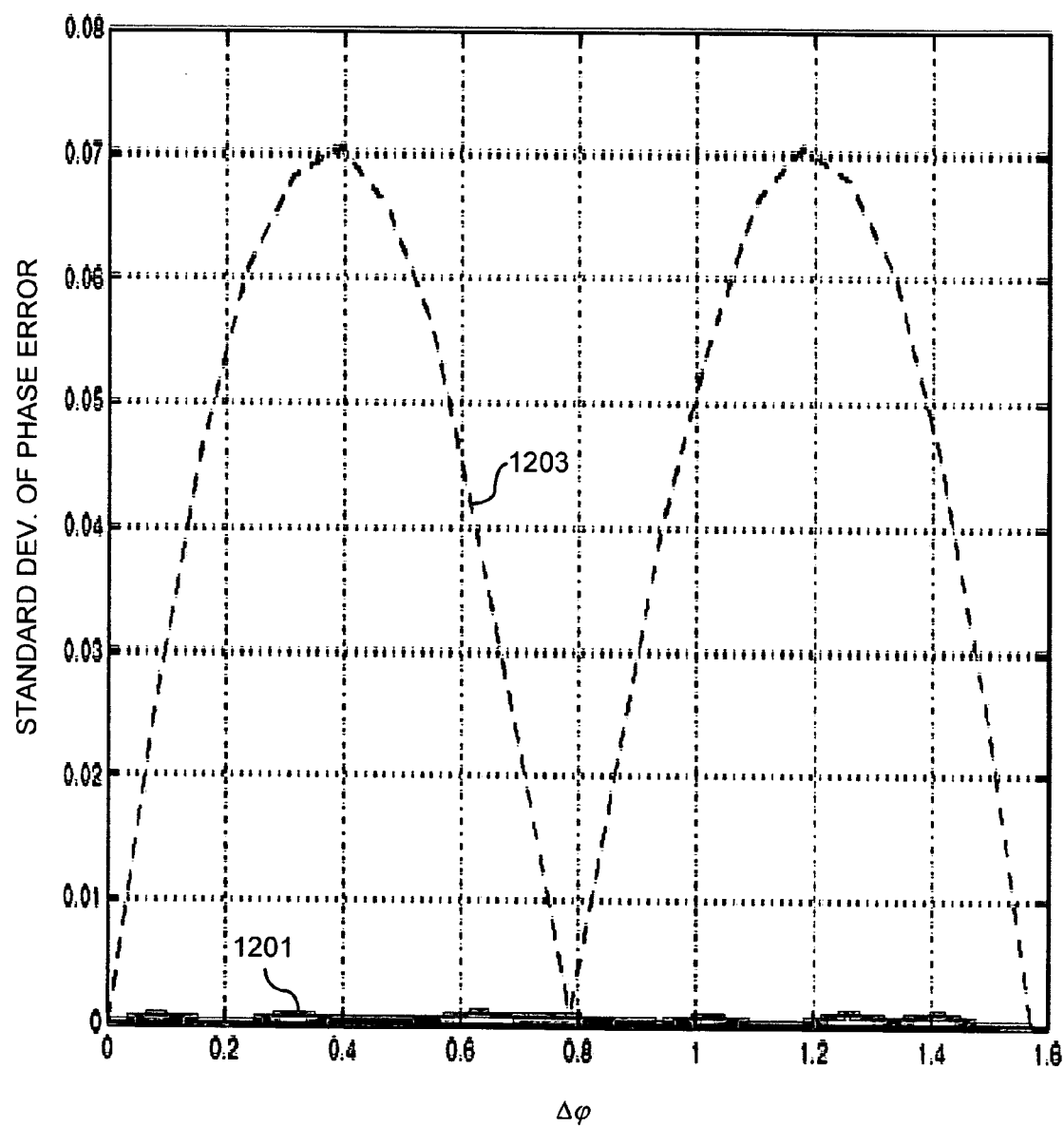
FIG. 12 depicts a first graph showing the standard deviation for the phase error plotted as a function of the phase offset when SNR=30 dB when there is bias compensation and a second graph for the case when there is no bias compensation.
Figure 13:
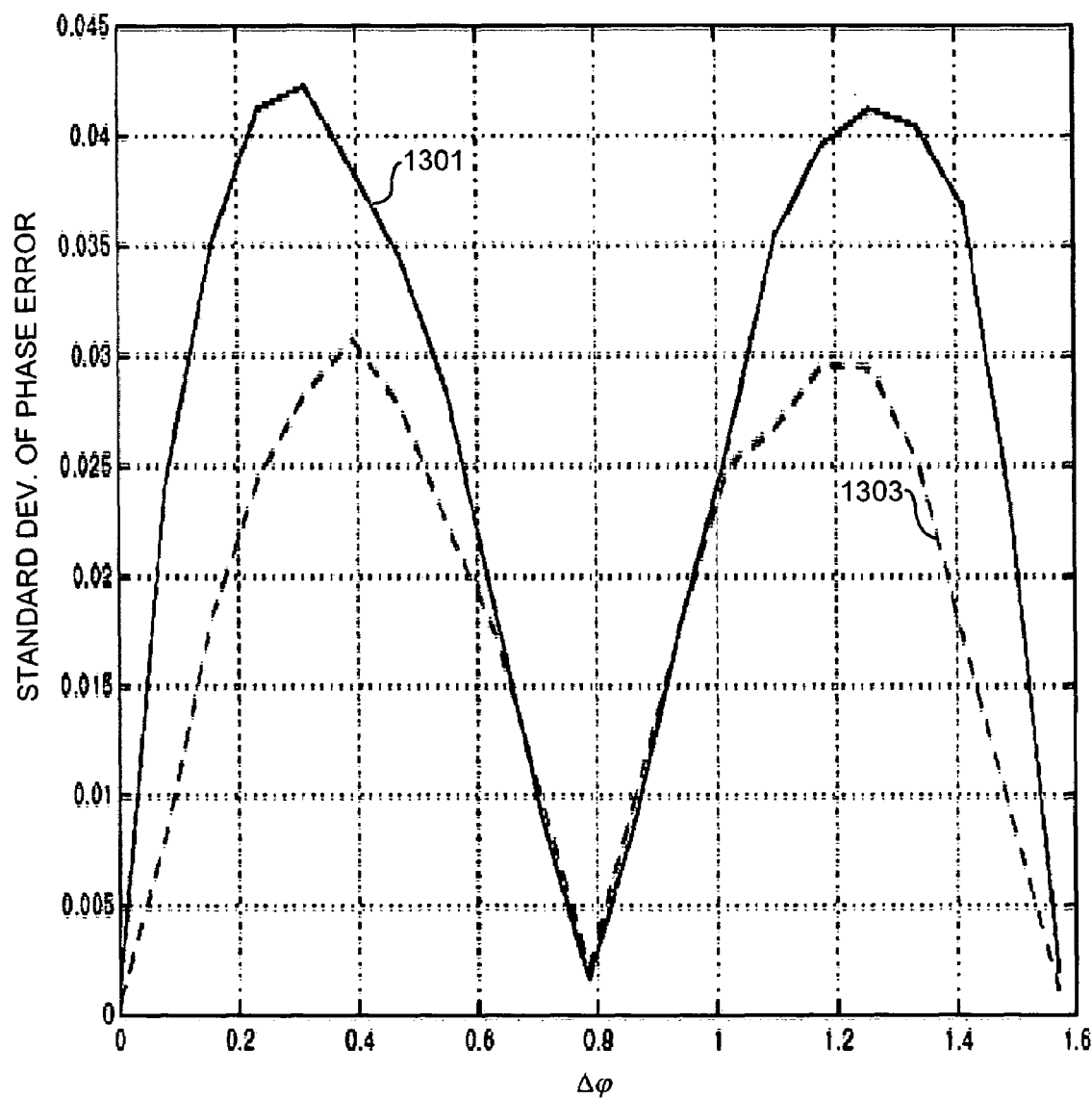
FIG. 13 depicts a first graph showing the standard deviation for the phase error plotted as a function of the phase offset when SNR=5 dB when there is bias compensation and a second graph for the case when there is no bias compensation.

The results in Table 9 are for the worst case frequency offset, where the bias is 12.6 Hz. As is apparent from FIG. 11, the accuracy will depend on the actual value of $\Delta\phi$. In FIGS. 12 and 13, the standard deviation for the phase error is depicted as a function of $\Delta\phi$. FIG. 12 corresponds to the case when SNR=30 dB. The graph 1201 shows the case with bias compensation, and the graph 1203 shows the case without bias compensation. FIG. 13 corresponds to the case when SNR=5 dB. The graph 1301 shows the case with bias compensation, and the graph 1303 shows the case without bias compensation. As can be seen, good results are obtained when $\Delta\phi$ is small, irrespective of the SNR.

Figure 2:
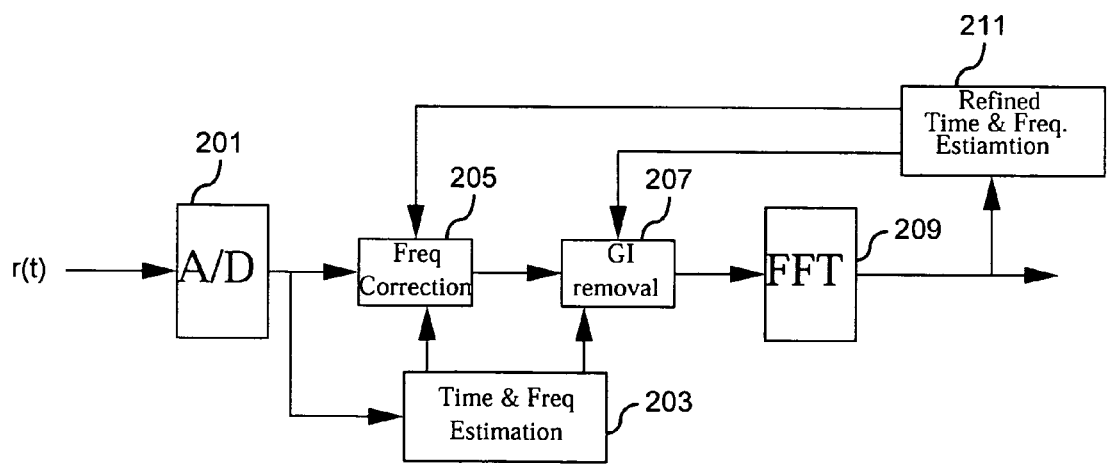
FIG. 2 is a block diagram of an exemplary OFDM receiver.
Figure 14A:
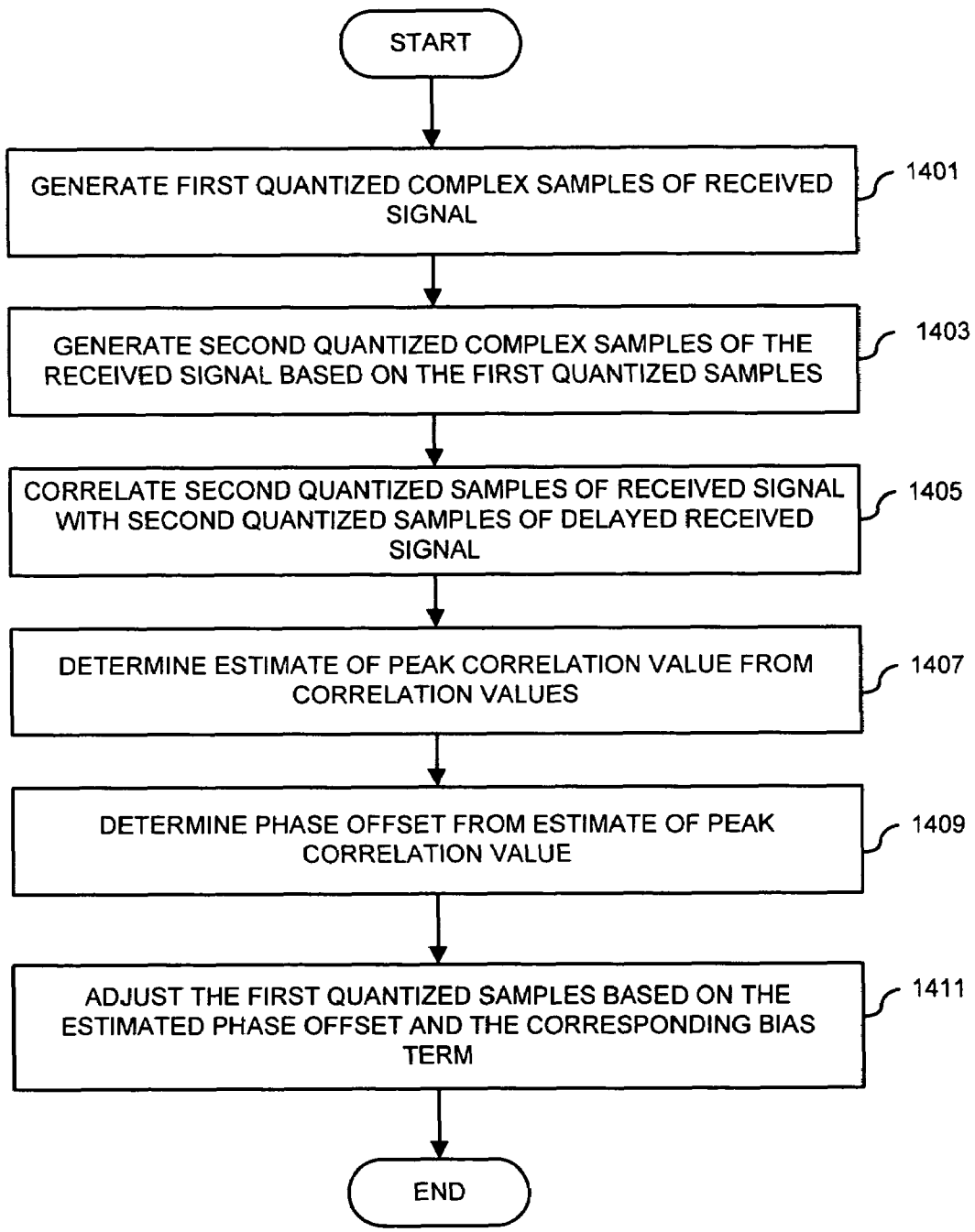
FIGS. 14a and 14b are exemplary flow diagrams of steps that may be carried out to implement coarse timing estimation in a programmable processor or other dedicated circuitry.

FIG. 14a is an exemplary flow diagram of steps that may be carried out to implement a number of the above-described aspects of coarse timing estimation and compensate for frequency error in a programmable processor or other dedicated circuitry. The exemplary embodiment begins by generating a first set of quantized samples of the received signal ("first quantized samples). For example, referring back to FIG. 2, such samples can be generated by the A/D converter 201, and may be of a suitable size (e.g., 10-bit quantization). For purposes of coarse timing estimation and frequency estimation, these first quantized samples can then be used as the basis for generating a second set of quantized samples of the received signal ("second quantized samples), wherein each sample comprises a 1-bit real part and a 1-bit imaginary part (block 1403). Correlation values are then generated by correlating the second quantized samples of the received signal with the second quantized samples of a delayed received signal (block 1405).

An estimate of a peak correlation value is determined from the generated correlation values (block 1407), and a phase offset is determined from the estimate of the peak correlation value (block 1409). The first quantized samples are then adjusted based on the phase offset and the corresponding bias term (block 1411). The bias term may be determined based on the relations provided in Table 8. Conversion to a frequency error can easily be performed based on the relationship between the phase offset ($\Delta\phi$) and the fractional frequency offset ($\Delta f_F$) expressed above in connection with equation (17). An efficient embodiment for determining the frequency offset is provided by using a look-up-table having stored therein values such that when any one of the stored values is selected for output, its relationship to the look-up-table's input value is based essentially on the relations provided in Table 8. Of course, in alternative embodiments, the frequency offset can be determined in other ways, such as by dynamically calculating it based on the relationships provided in Table 8 and the relationship between phase offset and frequency offset as expressed in equation (17).

As just described, FIG. 14a illustrates a technique whereby the amount of compensation for frequency error is determined directly. In alternative embodiments, the use of the look-up-table and/or direct calculation can be avoided by means of an iterative technique whereby the estimate of the amount of compensation for frequency error is typically improved with each iteration performed. An overview of the technique is: First obtain an initial estimate of $\Delta\phi$. The quality of the initial estimate will be known based on its value and knowledge of how the bias varies with the estimate obtained (see FIG. 11). For example, if the first estimate of $\Delta\phi$ is 0.4, then it is known that this estimate is rather poor, irrespective of the SNR. The received signal is then compensated with this first estimate, and a re-estimation of $\Delta\phi$ is performed. The next estimate of $\Delta\phi$ should be smaller, and hence subject to a smaller bias. The received signal may then be further compensated based on the new estimated value. This iterative process may be performed a set number of times, or alternatively may be performed until $\Delta\phi$ is less than a predetermined value (e.g., 0.05) that is known to have negligible (or at least acceptable levels of) bias due to quantization.

Figure 14B:
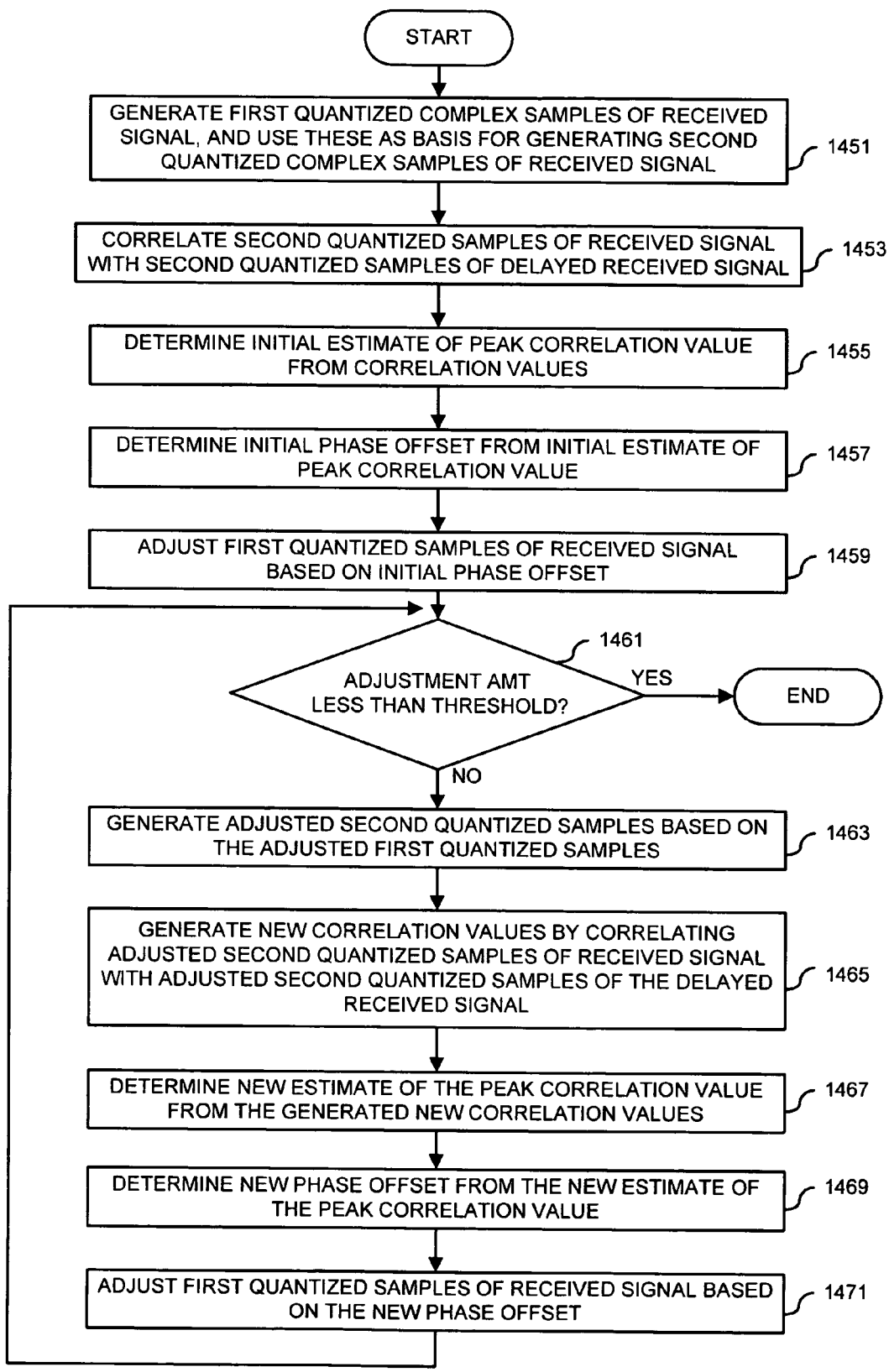

FIG. 14b is an exemplary flow diagram of steps that may be carried out to implement this iterative technique of performing coarse timing estimation and frequency error compensation in a programmable processor or other dedicated circuitry. The exemplary embodiment begins by generating first quantized samples of the received signal (as described above with respect to FIG. 14a), and using these as a basis for generating second quantized samples of the received signal, wherein each second quantized sample comprises a 1-bit real part and a 1-bit imaginary part (block 1451). Correlation values are then generated by correlating the second quantized samples of the received signal with the second quantized samples of a delayed received signal (block 1453).

An initial estimate of a peak correlation value is determined from the generated correlation values (block 1455), and an initial phase offset is determined from the initial estimate of the peak correlation value (block 1457). The first quantized samples of the received signal are adjusted by a frequency based on the phase offset (block 1459).

It is then determined whether the first quantized samples are sufficiently free of bias (e.g., by comparing the amount of adjustment to a predetermined threshold value) (decision block 1461). If it is ("YES" path out of decision block 1461), then the routine may end. Alternatively, the loop (to be described) can be designed to always execute a predetermined number of times rather than being based on the value of the phase/frequency offset compensation.

However, if the just-determined amount of adjustment is not good enough (or if not all of the predetermined number of iterations have been performed), then adjusted second quantized samples are generated based on the adjusted first quantized samples (block 1463). New correlation values are then generated by correlating the adjusted second quantized samples of the received signal with the adjusted second quantized samples of the delayed received signal (block 1465), and a new estimate of the peak correlation value is determined from the generated new correlation values (block 1467).

Next, a new phase offset is determined from the new estimate of the peak correlation value (block 1469). Then, the first quantized samples of the received signal are adjusted by a frequency based on the new phase offset (block 1471). Processing then returns to block 1461 so that the loop can be repeated until the "Done" condition of decision block 1461 is satisfied.

Figure 14C:
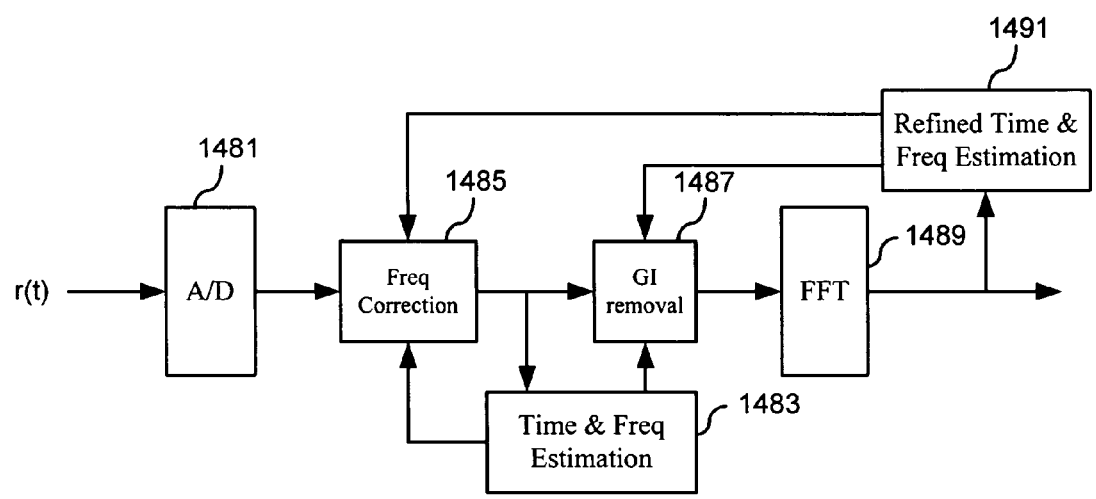
FIG. 14c is a block diagram of an exemplary OFDM receiver.

FIG. 14c is a block diagram of an exemplary OFDM receiver for performing e.g. the method steps of FIG. 14b. An analog signal, r(t), generated by receiving and downconverting a radiofrequency signal, is supplied to an analog-to-digital (A/D) converter 1481. The digitized signal, r(k), is then supplied to a frequency correction unit 1485, the output of which is in turn supplied to a coarse timing and frequency estimation unit 1483 as well as to a GI removal unit 1487. The frequency estimation unit 1483 generates a coarse estimate of the timing and frequency offset of the received signal, which is supplied to the frequency correction unit 1485 and to the GI removal unit 1487. Then the frequency correction unit 1485 adjusts the frequency of the digitized signal based on the coarse estimate of the timing and frequency offset. Based on the best timing and frequency information available, the GI removal unit 1487 removes the GI and supplies the information part of the received signal to an FFT unit 1489, whose output is supplied to the remainder of the receiver, including a refined timing and frequency estimation unit 1491, which is able to generate more accurate timing and frequency information from the FFT output signal. The more accurate frequency information is fed back to the frequency correction unit 1485 to improve the receiver's performance. The more accurate timing information is similarly fed back to the GI removal unit 1487 to improve the receiver's performance.

Up to this point, it has been assumed that the analog-to-digital converter (ADC) is perfect in the sense that the decision boundary is at zero. In practice there might be an offset, which will impact the performance. To see the effect of such a DC-offset, simulations were run with different offsets in the ADC. The testing considered both the case when only one of the ADCs (the one for the real part of the signal) was subject to offset and when both ADCs (i.e., one for the real part of the signal and the other for the imaginary part of the signal) were subject to offset. The DC-offset was set relative to the desired signal, so that the ratio of, for instance, −10 dB, means that $$\frac{(DC)^2}{\text{signal power}} = 0.1. \quad (23)$$

The standard deviation for frequency error (worst case frequency offset) for the case when NUM_TERMS=2048 and SNR=20 dB are given in Table 10. Non-bracketed values correspond to the case without compensation for the bias, and values in brackets correspond to the case with compensation for the bias.

TABLE 10

Standard deviation for frequency error (worst case frequency offset). Without compensation for the bias and with compensation for the bias (in parentheses).

| DC-offset [dB] | Only real part offset | Both real and imaginary part offset |
| --- | --- | --- |
| −10 | 17.6 (12.3) | 17.5 (12.4) |
| −15 | 13.7 (4.3) | 13.8 (4.3) |
| −20 | 12.5 (1.9) | 12.5 (1.9) |
| −25 | 12.3 (1.1) | 12.4 (1.0) |
| −30 | 12.2 (0.9) | 12.2 (0.8) |

For the case in which there was no quantization, the SNR was estimated by modifying the correlation operation in the sense that $$y(n)=r(n)-r(n-N)=s(n)+n(n)-s(n-N)-n(n-N). \quad (24)$$

For the case of a 1 bit ADC, we let $$y^q(n)=0.5(r^q(n)-r^q(n-N)) \quad (25)$$

From Equations (15) and (25), it follows that both the real part and the imaginary parts of $y^q(n)$ can take on the values −1,0,1, independently of one another. Considering the real (or the imaginary) part of $r(n)=s(n)+n(n)$, one might consider $r^q(n)$ as being in error if $r^q(n)s(n)<0$, that is, if the noise has altered the sign of the desired signal. It is clear that the probability for such an error will decrease as the SNR is increased. In a similar way it is clear that $E[|Re(y^q(n))|]$ will decrease as a function of the SNR.

Specifically, in case $s(n) \neq s(n-N)$, then $E[|Re(y^q(n))|]=0.5$, which gives no information about the SNR. In case $s(n)=s(n-N)$, it has been found that a good approximation for $E[|Re(y^q(n))|]$ is $$E[|Re(y^q(n))|] = \frac{0.45}{\sqrt{SNR}}. \quad (26)$$

Therefore, if we let $$corr_{mod}(n) = \sum_{k=0}^{NUM\_TERMS-1} |Re(y^q(n-k))| + |Im(y^q(n-k))|, \quad (27)$$

and $corr^q_{min}$ the minimum value such that $corr^q_{min} = \min\, corr^q_{mod}(n)$ then the SNR can be estimated as $$\widehat{SNR} = \left(\frac{0.9 NUM\_TERMS}{corr^q_{min}}\right)^2 \approx \left(\frac{NUM\_TERMS}{corr^q_{min}}\right)^2. \quad (28)$$

More generally, this can be expressed as $$\widehat{SNR} \approx \left(\frac{K}{corr^q_{min}}\right)^2, \quad (28')$$

where K is a constant such that $K=x_2 \cdot NUM\_TERMS$ where $0<x_2 \leq 1$. In the derivation presented above, it has been shown that the larger permissible values of $x_2$ work especially well. However, in other embodiments the designer may find it advantageous to use lower values, which can still serve to generate indications of the SNR. It should be understood that the constant 0.5 in equation (25) was chosen for normalization purposes in this particular non-limiting example. The constant may very well be chosen to equal other values such as 1. It should also be understood that $x_2$ may depend on the choice of the constant in equation (25).

Figure 15:
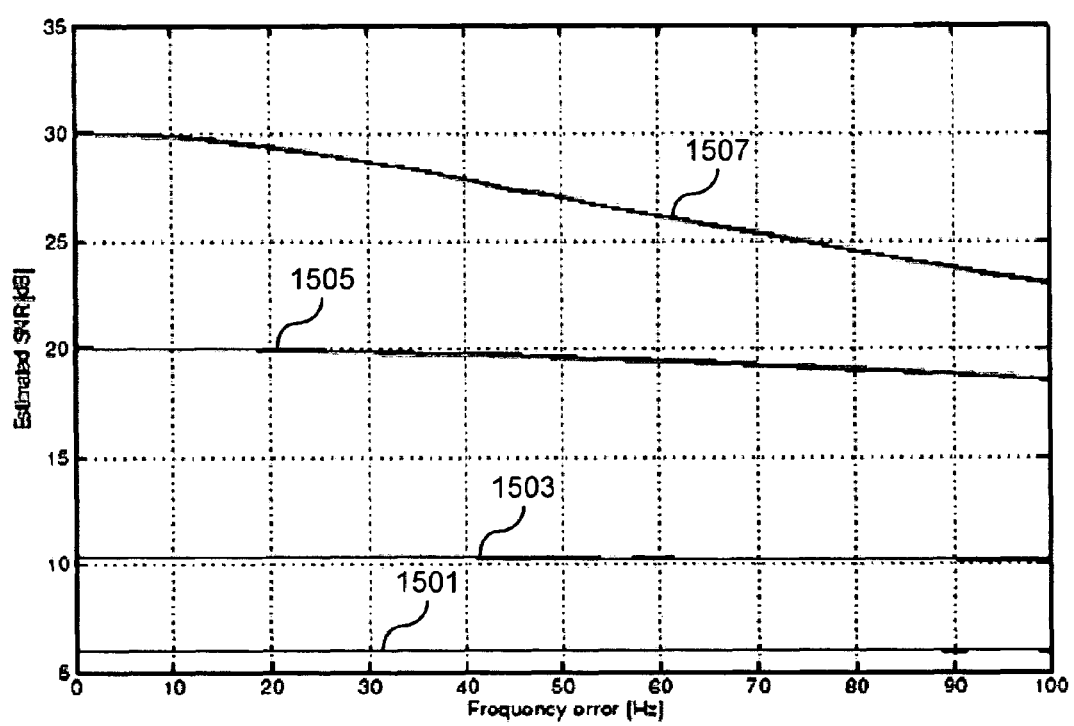
FIG. 15 depicts the estimated SNR as a function of the frequency error for some relevant values of the actual SNR.

Estimating the SNR by considering $y(n)=r(n)-r(n-N)$ assumes that there is no frequency error. It is easy to see that in case of frequency error, the estimated SNR will be too small. It is also intuitively clear that a frequency error will have more impact when there is a large SNR. In FIG. 15, the estimated SNR is depicted as a function of the frequency error for some relevant values of the actual SNR. Graph 1501 corresponds to the case in which the true SNR is 5 dB; graph 1503 corresponds to the case in which the true SNR is 10 dB; graph 1505 corresponds to the case in which the true SNR is 20 dB; and graph 1507 corresponds to the case in which the true SNR is 30 dB. Referring to the results obtained where frequency estimation was considered (see Tables 3-7 and 9), it can be seen that there should be no problem estimating the SNR in this way.

The effect of DC-offset was also considered with respect to SNR estimation. For DC-offsets less than −10 dB virtually no difference in the SNR estimate was seen. Thus, it is concluded that the algorithm is feasible for any reasonable value of the DC-offset.

Simulations were performed with a time-dispersive channel and where the time-synchronization was achieved by considering $$corr_{mod}^q(n) = \left|\sum_{k=0}^{NUM\_TERMS-1} \text{Re}(y^q(n-k))\right| + \left|\sum_{k=0}^{NUM\_TERMS-1} \text{Im}(y^q(n-k))\right| \quad (29)$$

For the estimated position of the peak, the frequency offset was then estimated as described in the previous section. When Algorithm 0 was used, a similar modification was done in that $|y(n)|$ was replaced by $|\text{Re}(y(n))|+|\text{Im}(y(n))|$.

A representative example of the difference between the performance of using a 1 bit ADC and floating point is shown in Table 11. More specifically, Table 11 shows statistics for the FFT window position compared to the optimum position when a 1-bit ADC is used (comparison with floating point results is shown in brackets). Where applicable, statistics for the frequency error, $T_m$ estimate, and SNR estimate are also given. The channel has two taps, $T_m=10$ µs and SNR=10 dB. The frequency offset is 50 Hz, and no compensation for the bias was applied.

TABLE 11

Statistics for the position where the FFT window is placed compared to the optimum position when a 1-bit ADC is used (comparison with floating point in round brackets).

|  | Alg 0 | Alg 1b | Alg 2a | Alg 2b |
|---|---|---|---|---|
| E[freq. error] Hz | −7.6 (0.0) | As Alg 0 | N/A | N/A |
| std[freq. error] Hz | 8.2 (1.4) | As Alg 0 | N/A | N/A |
| E[FFT pos error] µs | −108 (−107) | 0.9 (0.8) | −79 (−79) | −4.1 (−1.7) |
| std[FFT pos error] µs | 3.6 (3.6) | 2.7 (2.8) | 3.1 (0.8) | 4.7 (1.2) |
| E[$T_m$ est.] µs | N/A | 7.8 (8.3) | N/A | 12 (7.3) |
| std[$T_m$ est.] µs | N/A | 4.2 (4.4) | N/A | 6.7 (1.7) |
| E[SNR est.] dB | N/A | N/A | 11.5 (10.4) | As Alg 2a |
| std[SNR est.] dB | N/A | N/A | 1.6 (0.3) | As Alg 2a |

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating a coarse estimate of a location of an information carrying part of a symbol in a received signal in a telecommunication system, the method comprising:
   generating correlation values by correlating the received signal with a delayed received signal;
   identifying a maximum correlation value of the correlation values;
   identifying a duration in time during which the correlation values are greater than or equal to a predetermined percentage of the maximum correlation value, wherein the duration in time begins at a first moment in time and ends at a second moment in time;
   setting the coarse estimate of the location of the peak correlation value equal to a moment in time between the first moment in time and the second moment in time;
   determining an estimated delay spread, $T_m$, associated with the received signal in accordance with $T_m=2PW_{100-\Delta X}-PW_{100-2\Delta X}$, where:
   $PW_{100-\Delta X}$ is a first peak width representing a length of the duration of time between the first moment in time when the correlation values are greater than or equal to the predetermined percentage, X, of the maximum correlation value and the second moment in time when the correlation values are greater than or equal to the predetermined percentage, X, of the maximum correlation maximum value; and
   $PW_{100-2\Delta X}$ is a second peak width representing a length of a duration of time between a first moment in time when the correlation values are greater than or equal to 100−2ΔX % of the maximum correlation value, and a second moment in time when the correlation values are greater than or equal to 100−2ΔX % of the maximum correlation value, wherein ΔX=100−X.

2. The method of claim 1, wherein the moment in time between the first moment in time and the second moment in time is a midpoint between the first moment in time and the second moment in time.

3. The method of claim 1, wherein:
   the received signal comprises a guard interval followed by a symbol;
   the symbol comprises a first portion and a last portion;
   the guard interval comprises the last portion of the symbol; and
   the method comprises generating the delayed received signal by delaying the received signal an amount corresponding to the length of the symbol.

4. The method of claim 1, comprising:
   using the coarse estimate of the location of the peak correlation value to determine a starting point of a Fast Fourier Transform (FFT) window; and
   processing the received signal with an FFT having the FFT window that begins at the determined starting point.

5. The method of claim 1, wherein the received signal is an orthogonal frequency division multiplexing signal.

6. A method of generating a coarse estimate of a location of an information carrying part of a symbol in a received signal in a telecommunication system, the method comprising:
   generating correlation values by correlating the received signal with a delayed received signal;
   identifying a maximum correlation value of the correlation values;
   identifying a duration in time during which the correlation values are greater than or equal to a predetermined percentage of the maximum correlation value, wherein the duration in time begins at a first moment in time and ends at a second moment in time;
   setting the coarse estimate of the location of the peak correlation value equal to a moment in time between the first moment in time and the second moment in time;
   using the coarse estimate of the location of the peak correlation value to determine a starting point of a Fast Fourier Transform (FFT) window; and
   processing the received signal with an FFT having the FFT window that begins at the determined starting point,
wherein:
   the received signal comprises a guard interval followed by a symbol;
   the symbol comprises a first portion and a last portion;

the guard interval comprises the last portion of the symbol; and the method comprises:
 determining a bias term, $T_B$, in accordance with $T_B = x \cdot T_G$, wherein $T_G$ is the duration of the guard interval and $0 \leq x \leq 0.5$; and
 determining the starting point of the FFT window, $t_{FFT}$, in accordance with $$t_{FFT} = T_{peak} + T_B,$$

where $T_{peak}$ is the coarse estimate of the location of the peak correlation value.

7. The method of claim 6, wherein $T_B = T_G/2$.

8. A method of generating a coarse estimate of a location of an information carrying part of a symbol in a received signal in a telecommunication system, the method comprising:
 generating correlation values by correlating the received signal with a delayed received signal;
 identifying a maximum correlation value of the correlation values;
 identifying a duration in time during which the correlation values are greater than or equal to a predetermined percentage of the maximum correlation value, wherein the duration in time begins at a first moment in time and ends at a second moment in time;
 setting the coarse estimate of the location of the peak correlation value equal to a moment in time between the first moment in time and the second moment in time;
 using the coarse estimate of the location of the peak correlation value to determine a starting point of a Fast Fourier Transform (FFT) window; and
 processing the received signal with an FFT having the FFT window that begins at the determined starting point, wherein:
 the received signal comprises a guard interval followed by a symbol;
 the symbol comprises a first portion and a last portion;
 the guard interval comprises the last portion of the symbol; and
 the method comprises:
  determining an estimated delay spread, $T_m$, associated with the received signal;
  determining a bias term, $T_B$, in accordance with $T_B = T_G - x \cdot T_m$, wherein $0.5 \leq x \leq 1$; and
  determining the starting point of the FFT window, $t_{FFT}$, in accordance with $$t_{FFT} = T_{peak} + T_B,$$

where $T_{peak}$ is the coarse estimate of the location of the peak correlation value.

9. The method of claim 8, wherein $T_B = T_G - T_m/2$.

10. The method of claim 8, wherein the estimated delay spread, $T_m$, associated with the received signal is determined in accordance with $$T_m = 2PW_{100-\Delta X} - PW_{100-2\Delta X},$$

where:
 $PW_{100-\Delta X}$ is a first peak width representing a length of the duration of time between the first moment in time when the correlation values are greater than or equal to the predetermined percentage, X, of the maximum correlation value and the second moment in time when the correlation values are greater than or equal to the predetermined percentage, X, of the maximum correlation maximum value; and
 $PW_{100-2\Delta X}$ is a second peak width representing a length of a duration of time between a first moment in time when the correlation values are greater than or equal to 100-2ΔX % of the maximum correlation value, and a second moment in time when the correlation values are greater than or equal to 100-2ΔX % of the maximum correlation value, wherein ΔX=100-X.

11. A method of generating a coarse timing estimate of a received signal in a telecommunication system, wherein the received signal comprises a guard interval followed by a symbol; the symbol comprises a first portion and a last portion; and the guard interval comprises the last portion of the symbol, the method comprising:
 generating correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-k)|$$

$$= \sum_{k=0}^{NUM\_TERMS-1} |r(n-k) - r(n-k-N)|$$

where NUM_TERMS is the number of terms in the moving sum, and N is a number of samples associated with a duration of an information carrying part of the symbol;
 identifying a minimum plateau of the correlation values, wherein the minimum plateau is a duration in time during which the correlation values are associated with a minimum correlation value;
 determining a moment in time associated with the correlator values starting to increase from the correlation values associated with the minimum correlation value; and
 using the determined moment in time to determine a coarse estimate of the beginning of a next received symbol,
 wherein determining the moment in time associated with the correlator values starting to increase from the correlation values associated with the minimum correlation value comprises:
 determining a minimum correlation value of the correlation values;
 determining a maximum correlation value of the correlation values;
 determining a plateau of correlation values that are less than or equal to a value, $corr_{plateau}$, defined as $$corr_{plateau} = corr_{min} + X \cdot (corr_{max} - corr_{min}),$$

where $corr_{min}$ is the minimum correlation value, $corr_{max}$ is the maximum correlation value, and X is a number such that $0 < X < 1$;
 determining a first moment in time associated with a first-occurring one of the plateau of correlation values;
 determining a second moment in time associated with a last-occurring one of the plateau of correlation values; and
 determining a third moment in time that occurs between the first moment in time and the second moment in time.

12. The method of claim 11, wherein the third moment in time is a midpoint between the first moment in time and the second moment in time.

13. The method of claim 12, comprising:
 determining a bias term, $T_B$, in accordance with $T_B = x \cdot T_G$, wherein $T_G$ is the duration of the guard interval and $1.0 \leq x \leq 1.5$;
 determining a starting point of a Fast Fourier Transform (FFT) window, $t_{FFT}$, in accordance with $$t_{FFT} = T_{peak} + T_B,$$

where $T_{peak}$ is the determined third moment in time that occurs between the first moment in time and the second moment in time; and processing the received signal with an FFT having the FFT window that begins at the determined starting point.

14. The method of claim 12, further comprising: estimating a delay spread of the received signal in accordance with $$\hat{T}_m = T_G - T_{Num\_Terms} - PW_X,$$

wherein:
$T_G$ is a duration of the guard interval;
$T_{Num\_Terms}$ is a duration corresponding to the number of terms in the moving sum, NUM_TERMS;
$PW_X$ is a measure of duration of the minimum plateau of the correlation values; and the minimum plateau of the correlation values is determined by identifying those ones of the correlation values that are less than or equal to a value, $corr_{plateau}$, defined as $$corr_{plateau} = corr_{min} + X \cdot (corr_{max} - corr_{min}),$$

where $corr_{min}$ is a minimum correlation value, $corr_{max}$ is a maximum correlation value, and $0 \leq X < 1$.

15. The method of claim 14, comprising:
determining a bias term, $T_B$, in accordance with $T_B = 3T_G/2 - T_{NUM\_TERMS}/2 - x\hat{T}_m$ wherein $0.5 \leq x \leq 1.0$, and
determining the staffing point of a Fast Fourier Transform (FFT) window, $t_{FFT}$, in accordance with $$t_{FFT} = T_{peak} + T_B,$$

where $T_{peak}$ is the determined third moment in time that occurs between the first moment in time and the second moment in time; and processing the received signal with an FFT having the FFT window that begins at the determined staffing point.

16. A method of generating a coarse timing estimate of a received signal in a telecommunication system, wherein the received signal comprises a guard interval followed by a symbol; the symbol comprises a first portion and a last portion; and the guard interval comprises the last portion of the symbol, the method comprising:
generating correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-k)|$$

$$= \sum_{k=0}^{NUM\_TERMS-1} |r(n-k) - r(n-k-N)|$$

where NUM_TERMS is the number of terms in the moving sum, and N is a number of samples associated with a duration of an information carrying part of the symbol;
identifying a minimum plateau of the correlation values, wherein the minimum plateau is a duration in time during which the correlation values are associated with a minimum correlation value;
determining a moment in time associated with the correlator values starting to increase from the correlation values associated with the minimum correlation value;
using the determined moment in time to determine a coarse estimate of the beginning of a next received symbol;
determining a bias term, $T_B$, in accordance with $T_B = x \cdot T_G$, wherein $T_G$ is the duration of the guard interval and $0.5 \leq x \leq 1$;
determining a starting point of a Fast Fourier Transform (FFT) window, $t_{FFT}$, in accordance with $$t_{FFT} = T_{peak} + T_B,$$

where $T_{peak}$ is the determined moment in time associated with the correlator values starting to increase; and processing the received signal with an FFT having the FFT window that begins at the determined staffing point.

17. A method of generating a coarse timing estimate of a received signal in a telecommunication system, wherein the received signal comprises a guard interval followed by a symbol; the symbol comprises a first portion and a last portion; and the guard interval comprises the last portion of the symbol, the method comprising:
generating correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-k)|$$

$$= \sum_{k=0}^{NUM\_TERMS-1} |r(n-k) - r(n-k-N)|$$

where NUM_TERMS is the number of terms in the moving sum, and N is a number of samples associated with a duration of an information carrying part of the symbol;
identifying a minimum plateau of the correlation values, wherein the minimum plateau is a duration in time during which the correlation values are associated with a minimum correlation value;
determining a moment in time associated with the correlator values starting to increase from the correlation values associated with the minimum correlation value; and
using the determined moment in time to determine a coarse estimate of the beginning of a next received symbol;
determining a set of values, $corr_{mod}(n)$ in accordance with $$corr_{mod}(n) = \sum_{k=0}^{NUM\_TERMS-1} |y(n-k)|$$

$$= \sum_{k=0}^{NUM\_TERMS-1} |r(n-k) - r(n-k-N)|;$$

determining a maximum value, $corr_{max}$, such that $corr_{max} = \max(corr_{mod}(n))$;
determining a minimum value, $corr_{min}$, such that $corr_{min} = \min(corr_{mod}(n))$; and
determining a signal to noise ratio, SNR, of the received signal in accordance with:

$$\widehat{SNR} = \left(\frac{corr_{max}}{corr_{min}}\right)^2 - x_1,$$

where $x_t$ is either 0 or 1.

18. An apparatus for generating a coarse estimate of a location of an information carrying part of a symbol in a received signal in a telecommunication system, the apparatus comprising:
logic circuitry that generates correlation values by correlating the received signal with a delayed received signal;
logic circuitry that identifies a maximum correlation value of the correlation values;
logic circuitry that identifies a duration in time during which the correlation values are greater than or equal to a predetermined percentage of the maximum correlation value, wherein the duration in time begins at a first moment in time and ends at a second moment in time;

logic that circuitry sets the coarse estimate of the location of the peak correlation value equal to a moment in time between the first moment in time and the second moment in time;

logic that circuitry determines an estimated delay spread, $T_m$, associated with the received signal in accordance with $$T_m = 2PW_{100-\Delta X} - PW_{100-2\Delta X},$$

where:
$PW_{100-\Delta X}$ is a first peak width representing a length of the duration of time between the first moment in time when the correlation values are greater than or equal to the predetermined percentage, X, of the maximum correlation value and the second moment in time when the correlation values are greater than or equal to the predetermined percentage, X, of the maximum correlation maximum value; and $PW_{100-2\Delta X}$ is a second peak width representing a length of a duration of time between a first moment in time when the correlation values are greater than or equal to 100–2ΔX % of the maximum correlation value, and a second moment in time when the correlation values are greater than or equal to 100–2ΔX % of the maximum correlation value, wherein ΔX=100−X.

19. The apparatus of claim 18, wherein the moment in time between the first moment in time and the second moment in time is a midpoint between the first moment in time and the second moment in time.

20. The apparatus of claim 18, wherein:
the received signal comprises a guard interval followed by a symbol;
the symbol comprises a first portion and a last portion;
the guard interval comprises the last portion of the symbol; and
the apparatus comprises logic that generates the delayed received signal by delaying the received signal an amount corresponding to the length of the symbol.

21. The apparatus of claim 18, comprising:
logic circuitry that uses the coarse estimate of the location of the peak correlation value to determine a starting point of a Fast Fourier Transform (FFT) window; and
logic circuitry that processes the received signal with an FFT having the FFT window that begins at the determined starting point.

22. The apparatus of claim 18, wherein the received signal is an orthogonal frequency division multiplexing signal.

23. An apparatus for generating a coarse estimate of a location of an information carrying part of a symbol in a received signal in a telecommunication system, the apparatus comprising:
logic circuitry that generates correlation values by correlating the received signal with a delayed received signal;
logic circuitry that identifies a maximum correlation value of the correlation values;
logic circuitry that identifies a duration in time during which the correlation values are greater than or equal to a predetermined percentage of the maximum correlation value, wherein the duration in time begins at a first moment in time and ends at a second moment in time;
logic circuitry that sets the coarse estimate of the location of the peak correlation value equal to a moment in time between the first moment in time and the second moment in time;
logic circuitry that uses the coarse estimate of the location of the peak correlation value to determine a starting point of a Fast Fourier Transform (FFT) window; and
logic circuitry that processes the received signal with an FFT having the FFT window that begins at the determined starting point, wherein:
the received signal comprises a guard interval followed by a symbol;
the symbol comprises a first portion and a last portion;
the guard interval comprises the last portion of the symbol; and
the apparatus comprises:
logic circuitry that determines a bias term, $T_B$, in accordance with $T_B = x \cdot T_G$, wherein $T_G$ is the duration of the guard interval and $0 \leq x \leq 0.5$; and logic that determines the starting point of the FFT window, $t_{FFT}$, in accordance with $$t_{FFT} = T_{peak} + T_B,$$

where $T_{peak}$ is the coarse estimate of the location of the peak correlation value.

24. The apparatus of claim 23, wherein $T_B = T_G/2$.

25. An apparatus for generating a coarse estimate of a location of an information carrying part of a symbol in a received signal in a telecommunication system, the apparatus comprising:
logic circuitry that generates correlation values by correlating the received signal with a delayed received signal;
logic circuitry that identifies a maximum correlation value of the correlation values;
logic circuitry that identifies a duration in time during which the correlation values are greater than or equal to a predetermined percentage of the maximum correlation value, wherein the duration in time begins at a first moment in time and ends at a second moment in time;
logic circuitry that sets the coarse estimate of the location of the peak correlation value equal to a moment in time between the first moment in time and the second moment in time;
logic circuitry that uses the coarse estimate of the location of the peak correlation value to determine a starting point of a Fast Fourier Transform (FFT) window; and
logic circuitry that processes the received signal with an FFT having the FFT window that begins at the determined staffing point, wherein:
the received signal comprises a guard interval followed by a symbol;
the symbol comprises a first portion and a last portion;
the guard interval comprises the last portion of the symbol; and
the apparatus comprises:
logic circuitry that determines an estimated delay spread, $T_m$, associated with the received signal;
logic circuitry that determines a bias term, $T_B$, in accordance with $T_B = T_G - x \cdot T_m$, wherein $0.5 \leq x \leq 1$; and
logic circuitry that determines the starting point of the FFT window, $t_{FFT}$, in accordance with $$t_{FFT} = T_{peak} + T_B,$$

where $T_{peak}$ is the coarse estimate of the location of the peak correlation value.

26. The apparatus of claim 25, wherein $T_B = T_G - T_m/2$.

27. The apparatus of claim 25, wherein the estimated delay spread, $T_m$, associated with the received signal is determined in accordance with $$T_m = 2PW_{100-\Delta X} - PW_{100-2\Delta X},$$

where:
$PW_{100-\Delta X}$ is a first peak width representing a length of the duration of time between the first moment in time when the correlation values are greater than or equal to the predetermined percentage, X, of the maximum correlation value and the second moment in time when the correlation values are greater than or equal to the predetermined percentage, X, of the maximum correlation maximum value; and $PW_{100-2\Delta X}$ is a second peak width representing a length of a duration of time between a first moment in time when the correlation values are greater than or equal to 100−2ΔX % of the maximum correlation value, and a second moment in time when the correlation values are greater than or equal to 100−2ΔX % of the maximum correlation value, wherein ΔX=100−X.

28. An apparatus for generating a coarse timing estimate of a received signal in a telecommunication system, wherein the received signal comprises a guard interval followed by a symbol; the symbol comprises a first portion and a last portion; and the guard interval comprises the last portion of the symbol, the apparatus comprising:

logic circuitry that generates correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-k)|$$
$$= \sum_{k=0}^{NUM\_TERMS-1} |r(n-k) - r(n-k-N)|$$

where NUM_TERMS is the number of terms in the moving sum, and N is a number of samples associated with a duration of an information carrying part of the symbol;

logic circuitry that identifies a minimum plateau of the correlation values, wherein the minimum plateau is a duration in time during which the correlation values are associated with a minimum correlation value;

logic circuitry that determines a moment in time associated with the correlator values starting to increase from the correlation values associated with the minimum correlation value; and logic circuitry that uses the determined moment in time to determine a coarse estimate of the beginning of a next received symbol, wherein the logic that determines the moment in time associated with the correlator values starting to increase from the correlation values associated with the minimum correlation value comprises:

logic circuitry that determines a minimum correlation value of the correlation values;

logic circuitry that determines a maximum correlation value of the correlation values;

logic circuitry that determines a plateau of correlation values that are less than or equal to a value, $corr_{plateau}$, defined as $corr_{plateau} = corr_{min} + X \cdot (corr_{max} - corr_{min})$, where $corr_{min}$ is the minimum correlation value, $corr_{max}$ is the maximum correlation value, and X is a number such that 0<X<1;

logic circuitry that determines a first moment in time associated with a first-occurring one of the plateau of correlation values;

logic circuitry that determines a second moment in time associated with a last-occurring one of the plateau of correlation values; and logic circuitry that determines a third moment in time that occurs between the first moment in time and the second moment in time.

29. The apparatus of claim 28, wherein the third moment in time is a midpoint between the first moment in time and the second moment in time.

30. The apparatus of claim 29, comprising:

logic circuitry that determines a bias term, $T_B$, in accordance with $T_B = x \cdot T_G$, wherein $T_G$ is the duration of the guard interval and 1.0≤x≤1.5;

logic circuitry that determines a starting point of a Fast Fourier Transform (FFT) window, $t_{FFT}$, in accordance with $t_{FFT} = T_{peak} + T_B$, where $T_{peak}$ is the determined third moment in time that occurs between the first moment in time and the second moment in time; and logic circuitry that processes the received signal with an FFT having the FFT window that begins at the determined starting point.

31. The apparatus of claim 29, further comprising:

logic circuitry that estimates a delay spread of the received signal in accordance with $\hat{T}_m = T_G - T_{Num\_Terms} - PW_X$, wherein:

$T_G$ is a duration of the guard interval;

$T_{Num\_Terms}$ is a duration corresponding to the number of terms in the moving sum, NUM_TERMS;

$PW_X$ is a measure of duration of the minimum plateau of the correlation values; and logic circuitry that determines the minimum plateau of the correlation values by identifying those ones of the correlation values that are less than or equal to a value, $corr_{plateau}$, defined as $corr_{plateau} = corr_{min} + X \cdot (corr_{min} - corr_{min})$, where $corr_{min}$ is a minimum correlation value, $corr_{max}$ is a maximum correlation value, and 0≤X<1.

32. The apparatus of claim 31, comprising:

logic circuitry that determines a bias term, $T_B$, in accordance with $T_B = 3T_G/2 - T_{NUM\_TERMS}/2 - x\hat{T}_m$ wherein 0.5≤x≤1.0; and logic circuitry that determines the staffing point of a Fast Fourier Transform (FFT) window, $t_{FFT}$, in accordance with $t_{FFT} = T_{peak} + T_B$, where $T_{peak}$ is the determined third moment in time that occurs between the first moment in time and the second moment in time; and logic circuitry that processes the received signal with an FFT having the FFT window that begins at the determined starting point.

33. An apparatus for generating a coarse timing estimate of a received signal in a telecommunication system, wherein the received signal comprises a guard interval followed by a symbol; the symbol comprises a first portion and a last portion; and the guard interval comprises the last portion of the symbol, the apparatus comprising:

logic circuitry that generates correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-1)|$$

$$= \sum_{k=0}^{NUM\_TERMS-1} |r(n-k) - r(n-k-N)|$$

where $NUM_{13}TERMS$ is the number of terms in the moving sum, and N is a number of samples associated with a duration of an information carrying part of the symbol;

logic circuitry that identifies a minimum plateau of the correlation values, wherein the minimum plateau is a duration in time during which the correlation values are associated with a minimum correlation value;

logic circuitry that determines a moment in time associated with the correlator values starting to increase from the correlation values associated with the minimum correlation value; and logic circuitry that uses the determined moment in time to determine a coarse estimate of the beginning of a next received symbol;

logic circuitry that determines a bias term, $T_B$, in accordance with $T_B = x \cdot T_G$, wherein $T_G$ is the duration of the guard interval and $0.5 \leq x \leq 1$;

logic circuitry that determines a starting point of a Fast Fourier Transform (FFT) window, $t_{FFT}$, in accordance with $$t_{FFT} = T_{peak} + T_B,$$

where $T_{peak}$ is the determined moment in time associated with the correlator values starting to increase; and logic circuitry that processes the received signal with an FFT having the FFT window that begins at the determined starting point.

34. An apparatus for generating a coarse timing estimate of a received signal in a telecommunication system, wherein the received signal comprises a guard interval followed by a symbol; the symbol comprises a first portion and a last portion; and the guard interval comprises the last portion of the symbol, the apparatus comprising:

logic circuitry that generates correlation values by, for each sample, r(n), of the received signal, generating a correlation value, $corr_{mod}(n)$, in accordance with:

$$corr_{mod}(n) = \sum_{k=0}^{NUM\_TERMS-1} |y(n-1)|$$

$$= \sum_{k=0}^{NUM\_TERMS-1} |r(n-k) - r(n-k-N)|$$

where NUM_TERMS is the number of terms in the moving sum, and N is a number of samples associated with a duration of an information carrying part of the symbol;

logic circuitry that identifies a minimum plateau of the correlation values, wherein the minimum plateau is a duration in time during which the correlation values are associated with a minimum correlation value;

logic circuitry that determines a moment in time associated with the correlator values starting to increase from the correlation values associated with the minimum correlation value; and logic circuitry that uses the determined moment in time to determine a coarse estimate of the beginning of a next received symbol;

logic circuitry that determines a set of values, $corr_{mod}(n)$ in accordance with $$corr_{mod}(n) = \sum_{k=0}^{NUM\_TERMS-1} |y(n-k)|$$

$$= \sum_{k=0}^{NUM\_TERMS-1} |r(n-k) - r(n-k-N)|;$$

logic circuitry that determines a maximum value, $corr_{max}$, such that $corr_{max} = \max(corr_{mod}(n))$;

logic circuitry that determines a minimum value, $corr_{min}$, such that $corr_{min} = \min(corr_{mod}(n))$; and logic circuitry that determines a signal to noise ratio, SNR, of the received signal in accordance with:

$$\widehat{SNR} = \left(\frac{corr_{max}}{corr_{min}}\right)^2 - x_1,$$

where $x_1$ is either 0 or 1.

35. A machine readable storage medium having stored thereon a set of program instructions that cause a processor to generate a coarse estimate of a location of an information carrying part of a symbol in a received signal in a telecommunication system, the set of program instructions comprising instructions that cause the processor to perform:

generating correlation values by correlating the received signal with a delayed received signal;

identifying a maximum correlation value of the correlation values;

identifying a duration in time during which the correlation values are greater than or equal to a predetermined percentage of the maximum correlation value, wherein the duration in time begins at a first moment in time and ends at a second moment in time;

setting the coarse estimate of the location of the peak correlation value equal to a moment in time between the first moment in time and the second moment in time, determining an estimated delay spread, $T_m$, associated with the received signal in accordance with $$T_m = 2PW_{100-\Delta X} - PW_{100-2\Delta X},$$

where:

$PW_{100-\Delta X}$ is a first peak width representing a length of the duration of time between the first moment in time when the correlation values are greater than or equal to the predetermined percentage, X, of the maximum correlation value and the second moment in time when the correlation values are greater than or equal to the predetermined percentage, X, of the maximum correlation maximum value; and $PW_{100-2\Delta}$ is a second peak width representing a length of a duration of time between a first moment in time when the correlation values are greater than or equal to 100−2ΔX % of the maximum correlation value, and a second moment in time when the correlation values are greater than or equal to 100−2ΔX % of the maximum correlation value, wherein ΔX=100−X.

\* \* \* \* \*